(12) United States Patent
Horton et al.

(10) Patent No.: US 7,009,620 B2
(45) Date of Patent: Mar. 7, 2006

(54) SYSTEM AND METHOD FOR COMBINING PARAMETRIC TEXTURE MAPS

(75) Inventors: Noah Horton, Boulder, CO (US); Bradford A. Ritter, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 132 days.

(21) Appl. No.: 10/630,107

(22) Filed: Jul. 30, 2003

(65) Prior Publication Data

US 2005/0024373 A1 Feb. 3, 2005

(51) Int. Cl.
G09G 5/00 (2006.01)

(52) U.S. Cl. ........................................ 345/586; 382/285

(58) Field of Classification Search ................ 345/423, 345/426, 428, 552, 582–585, 586–587, 619, 345/639, 646–647; 382/285; 715/848
See application file for complete search history.

(56) References Cited

U.S. PATENT DOCUMENTS

| | | | | |
|---|---|---|---|---|
| 4,855,934 | A | * | 8/1989 | Robinson ..................... 345/582 |
| 5,561,756 | A | * | 10/1996 | Miller et al. ................. 715/848 |
| 5,805,782 | A | * | 9/1998 | Foran .......................... 345/426 |
| 5,943,058 | A | | 8/1999 | Nagy |
| 5,973,701 | A | | 10/1999 | Vaswani |
| 6,037,949 | A | | 3/2000 | DeRose et al. |
| 6,057,850 | A | * | 5/2000 | Kichury ....................... 345/584 |
| 6,078,332 | A | | 6/2000 | Ohazama |
| 6,163,320 | A | | 12/2000 | Barcena et al. |
| 6,169,553 | B1 | | 1/2001 | Fuller et al. |
| 6,229,547 | B1 | | 5/2001 | Grzeszczuk |
| 6,288,730 | B1 | | 9/2001 | Duluk, Jr. et al. |
| 6,326,975 | B1 | | 12/2001 | Shaw |
| 6,348,917 | B1 | | 2/2002 | Vaswani |
| 6,417,860 | B1 | | 7/2002 | Migdal et al. |
| 6,462,747 | B1 | | 10/2002 | Oh |
| 6,515,674 | B1 | * | 2/2003 | Gelb et al. ................... 345/582 |
| 2002/0060679 | A1 | * | 5/2002 | Malzbender et al. ........ 345/423 |

FOREIGN PATENT DOCUMENTS

WO       WO 01/71668        9/2001

OTHER PUBLICATIONS

Weinhaus, F., Devarajan, V., "Texture Mapping 3D Models of Real-World Scenes," ACM Computing Surveys, vol. 39, Issue 4, Dec. 1997, pp 325-365.*

Hel-Or, Y., Malzbender, T., Gelb, D., "Synthesis of Reflectance Function Textures from Examples," HP Technical Reports, HPL-2003-16 (R.1)., Apr. 9, 2003.*

(Continued)

*Primary Examiner*—Kee M. Tung
*Assistant Examiner*—Alysa N. Brautigam

(57) ABSTRACT

A texture mapping system comprises memory and a texture map manager. The memory stores a first texture map and a parametric texture map. The texture map manager is configured to combine at least a portion of the first texture map and at least a portion of the parametric texture map, and the texture map manager is configured to determine a texture map type for the first texture map and a texture map type for the parametric texture map and to perform a prioritization of the texture map portions based on the determined texture map types. The texture map manager is further configured to select, for conversion, one of the texture map portions based on the prioritization and to convert the selected texture map portion into a form corresponding to a form of the non-selected texture map portion.

19 Claims, 15 Drawing Sheets

OTHER PUBLICATIONS

Paris, S., Xillion, F., Quan, L., "Lightweight Face Relighting," Proc. of 11th Pac. Conf. on Computer Graphics and Applications, IEEE, 2003.*

Malzbender, T., Gelb, D., Wolters, H., Zuckerman, B., "Enhancement of Shape Perception by Surface Reflectance Transformation," HP Technical Reports, HPL-2000-38R1, 2000.*

Malzbender, T., Gelb, D., Wolters, H., "Polynomial Texture Map (.ptm) File Format," HP Technical Reports, HPL-2001-104, 2001.*

Malzbender, T., Gelb, D., Wolters, H., "Polynomial Texture Maps" HP Technical Reports, HPL-2001-33R1, 2001.*

Paris, S., Xillion, F., Quan, L., "Lightweight Face Relighting," Proc. of 11th Pac. Conf. on Computer Graphics and Applications, IEEE, 2003.*

* cited by examiner (Side View)

(Bottom View)

(Side View)

(Top View)

SYSTEM AND METHOD FOR COMBINING PARAMETRIC TEXTURE MAPS

BACKGROUND OF THE INVENTION

RELATED ART

Texture mapping typically involves mapping a source image, referred to as a "texture," onto a surface of a graphical object. The texture is normally defined by a texture map having a plurality of point elements, referred to as "texels." Each texel comprises one or more color component values and a set of texel coordinates. Each color component value is indicative of one of the texel's color components (e.g., red, green, or blue), and the texel coordinates are indicative of the texel's position within the texture.

During texture mapping, a texture mapper receives graphical data (e.g., primitives) defining a surface of a graphical object, and the texture mapper maps the pixels of the object's surface to the texels of the texture map. In this regard, based on a pixel's coordinate values, the texture mapper maps the pixel to one or more corresponding texels of the texture map. If there is only one corresponding texel, then the texture mapper assigns the color component values of the one corresponding texel to the pixel. If there are multiple corresponding texels, then the texture mapper interpolates color component values from the color component values of the corresponding texels and then assigns the interpolated color component values to the pixel. The color component values assigned to the different pixels by the texture mapper are then utilized to color the object's surface when the object is displayed by a display device, such as a display monitor or a printer, for example. Moreover, the surface of the displayed object appears to have a texture that corresponds to the source image defined by the afore-described texture map.

Employing texture mapping generally facilitates the creation of more complex and realistic images. In this regard, when texture mapping techniques are employed, it is not necessary for the primitives of a graphical object to define the texture of the object's surface, thereby reducing the amount of graphical data included in the primitives. Thus, storage and processing of the primitives are generally facilitated. During rendering, a graphics adapter can take a texture map defining a small image of a complex texture and, using various techniques, such as tiling, for example, apply the texture to the surface of the graphical object such that the object's surface appears to be textured according to the source image defined by the texture map.

Indeed, utilizing conventional texture mapping techniques, graphical display systems have efficiently produced fairly realistic and complex images. However, better techniques for generating and processing texture maps, thereby further improving the textured appearance of graphical objects, are generally desirable.

SUMMARY OF THE INVENTION

The present invention generally pertains to a texture mapping system and method for combining texture maps.

An exemplary texture mapping system in accordance with one embodiment of the present invention comprises memory and a texture map manager. The memory stores a first texture map and a parametric texture map. The texture map manager is configured to combine at least a portion of the first texture map and at least a portion of the parametric texture map, and the texture map manager is configured to determine a texture map type for the first texture map and a texture map type for the parametric texture map and to perform a prioritization of the texture map portions based on the determined texture map types. The texture map manager is further configured to select, for conversion, one of the texture map portions based on the prioritization and to convert the selected texture map portion into a form corresponding to a form of the non-selected texture map portion.

An exemplary texture mapping system in accordance with another embodiment of the present invention comprises memory and a texture map manager. The memory stores a first texture map and a parametric texture map. The texture map manager is configured to receive a command to combine at least a portion of the first texture map and at least a portion of the parametric texture map. The texture map manager is configured to convert, in response to the command, the first texture map portion into a form corresponding to a form of the parametric texture map portion and to combine the first texture map portion and the parametric texture map portion.

An exemplary texture mapping method in accordance with an embodiment of the present invention comprises determining a texture map type of a first texture map and a texture map type of a parametric texture map, combining at least a portion of the first texture map and at least a portion of the parametric texture map, prioritizing the texture map portions based on the determined texture map types, selecting one of the texture map portions based on the prioritizing, and converting, based on the selecting, the selected texture map portion into a form compatible with a form of the non-selected texture map portion.

An exemplary texture mapping method in accordance with another embodiment of the present invention comprises receiving a command to combine at least a portion of a first texture map and at least a portion of a parametric texture map, converting, in response to the command, the first texture map into a form compatible with a form of the parametric texture map portion, and combining the first texture map portion and the parametric texture map portion in response to the command.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION

Graphical display systems are often used to generate simulated images of physical objects. However, some physical objects possess certain characteristics that are difficult for a graphical display system to accurately simulate. For example, an object sometimes has a surface that does not appear to respond to changes in light directions in a homogenous fashion across the object's surface. More specifically, the luminosity of one point on an object's surface may appear to behave differently, based on light position, than the luminosity of another point on the object's surface.

For example, if a light source is positioned at an angle ($\alpha$) relative to a first point on the object's surface and is moved to an angle ($\beta$) relative to the first point, the luminosity of the first point may appear to change in a particular manner as the light source is being moved from angle ($\alpha$) to angle ($\beta$). However, if the light source is positioned at the same angle ($\alpha$) relative to a second point on the object's surface and is moved to the same angle ($\beta$) relative to the second point, the luminosity of the second point may appear to change in an entirely different manner as the light source is being moved from angle ($\alpha$) to angle ($\beta$).

Such a phenomena is not always noticeable to a viewer and is often more pronounced for less homogenous surfaces. As an example, many cloth fabrics have several different threads of different sizes and colors interwoven together and have a surface that is substantially non-homogenous. Moreover, the luminosity behavior of objects covered with such cloth material often appears to change as the position of the light source illuminating the objects changes.

Conventional texture mapping systems typically do not attempt to account for the aforedescribed phenomena when applying a texture to a surface of a graphical object. In this regard, typical texel values in a conventional texture map are constant color values and, in particular, do not account for the fact that different texels of a texture defined by the texture map may, in reality, appear to respond to light in a different manner than other texels. A texture mapping system in accordance with a preferred embodiment of the present invention, on the other hand, accounts for the phenomena that different texels of the texture defined by a texture map may appear to respond to light in a different manner as a light source is moved relative to the texels. Thus, more realistic graphical images are possible.

Figure 1:
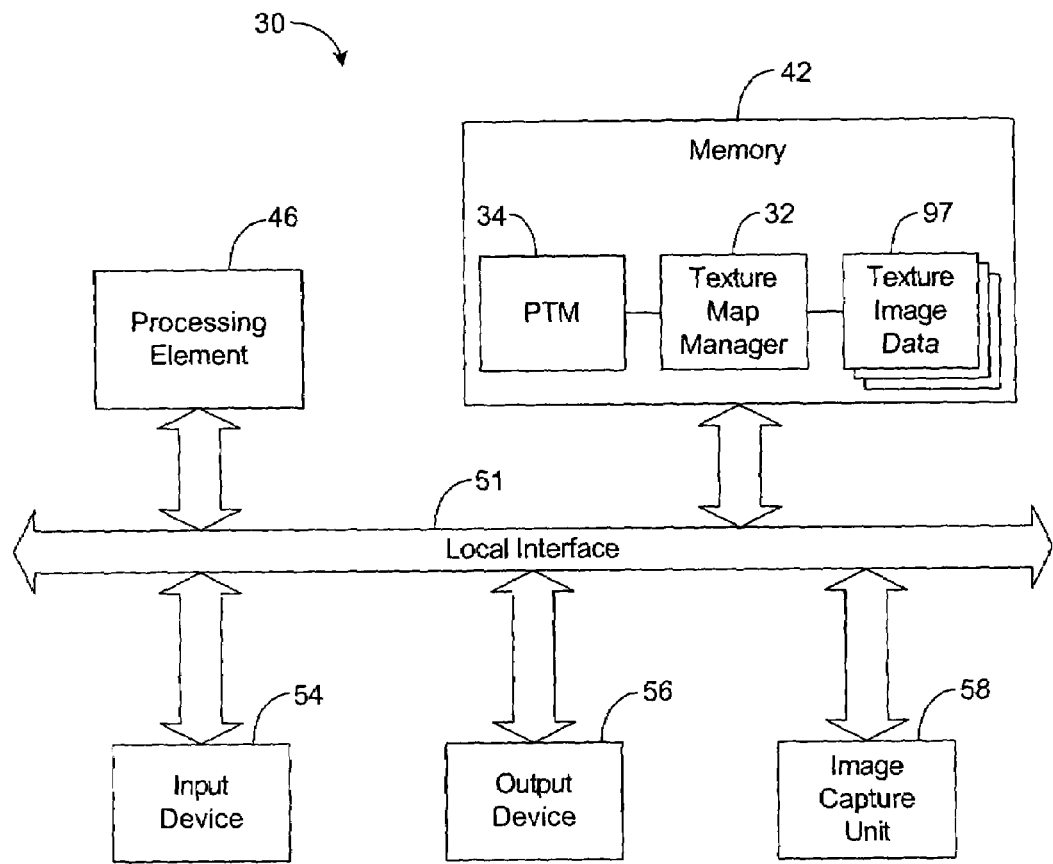
FIG. 1 is a block diagram illustrating a texture map generating and editing system in accordance with an exemplary embodiment of the present invention.

In this regard, FIG. 1 depicts a texture map generating and editing system 30 in accordance with a preferred embodiment of the present invention. As shown by FIG. 1, the system 30 preferably comprises a texture map manager 32 for generating and editing a parametric texture map (PTM) 34. As will be described in more detail hereafter, each texel of the PTM 34 preferably comprises at least one polynomial texture equation that allows the texel's luminosity value to be calculated as a function of light position or some other variable parameter. As used herein, a texel's "luminosity value" refers to a value indicative of at least the texel's brightness. In this regard, a texel's luminosity value may only indicate brightness or may indicate another color parameter combined with the texel's brightness. For example, a luminosity value may be a value that is indicative of a texel's brightness, independent of the texel's color, or a luminosity value, in another example, may be a value indicative of both color and brightness.

Note that the texture map manager 32 can be implemented in software, hardware, or any combination thereof. In a preferred embodiment, as illustrated by way of example in FIG. 1, the texture map manager 32, along with its associated methodology, is implemented in software and stored in memory 42 of the texture map generating and editing system 30.

Further note that the texture map manager 32, when implemented in software, can be stored and transported on any computer-readable medium for use by or in connection with an instruction execution system, apparatus, or device, such as a computer-based system, processor-containing system, or other system that can fetch and execute instructions. In the context of this document, a "computer-readable medium" can be any means that can contain, store, communicate, propagate, or transport a program for use by or in connection with the instruction execution system, apparatus, or device. The computer readable-medium can be, for example but not limited to, an electronic, magnetic, optical, electromagnetic, infrared, or semiconductor system, apparatus, device, or propagation medium. Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the texture map manager 32 may be magnetically stored and transported on a conventional portable computer diskette.

A preferred embodiment of the graphical display system 30 of FIG. 1 comprises one or more conventional processing elements 46, such as a digital signal processor (DSP) or a central processing unit (CPU), that communicate to and drive the other elements within the system 30 via a local interface 51, which can include one or more buses. Furthermore, an input device 54, for example, a keyboard or a mouse, can be used to input data from a user of the system 30, and an output device 56, for example, a screen display or a printer, can be used to output data to the user.

In a preferred embodiment, the texture map manager 32 controls an image capture unit 58 for capturing a plurality of images of an object. As will be described in more detail below, for each captured image, the object is preferably lit by a light source from a different direction. The texture map manager 32 preferably analyzes the captured images to generate the PTM 34. Each texel of the PTM 34 may comprise color component values, which each represent one of the texel's color components. In a preferred embodiment, each texel comprises red (R), green (G), and blue (B) color component values, although color components other than red, green, and blue may be utilized in other embodiments.

In addition to the color component values, each texel also may comprise data defining a polynomial texture equation, also referred to herein as a "luminosity equation," representing the texel's luminosity behavior as a function of light direction.

As will be described in more detail below, each luminosity equation is preferably based on a measure of luminosity values at a corresponding pixel of the captured images.

In this regard, each texel preferably corresponds to a particular set of pixel coordinates of the captured images. Further, to determine a polynomial texture equation for a texel, the texture map manager 32 may determine, for each of the captured images, the luminosity value of the pixel at the texel's corresponding set of coordinates. The determined luminosity values, referred to as "sample luminosity values," may indicate both color and brightness and may be averaged to determine the texel's color component values. In this regard, the red, green, and blue color component values (R, G, and B) assigned to the texel may respectively correspond to the red, green, and blue color components of the averaged luminosity value (i.e., the value averaged from the sample luminosity values). Furthermore, based on the foregoing sample luminosity values, the texture map manager 32 also may determine the texel's polynomial texture equation as a function of light position.

Such a polynomial texture equation preferably represents the luminosity behavior of the texel as the position of a light source illuminating the texel changes. Note that the polynomial texture equations of different texels may be different, thereby enabling the texture map manager 32 to establish a different luminosity behavior for different texels. Indeed, by assigning different texture equations to different texels, the manager 32 is able to account for the phenomena that different points of a non-homogenous surface may appear to respond differently to changes in light direction. As a result, a more realistic image of a graphical object may be produced when the PTM 34 is applied to the object's surface.

An exemplary methodology for generating the PTM 34 will now be described in more detail. In this regard, the image capture unit 58, operating under the direction and control of the texture map manager 32, preferably captures a plurality of images of a sample object, such as a piece of fabric, for example. As will be described in more detail hereafter, each of the images is preferably captured when the sample object is being lit from a different direction.

Figure 2:
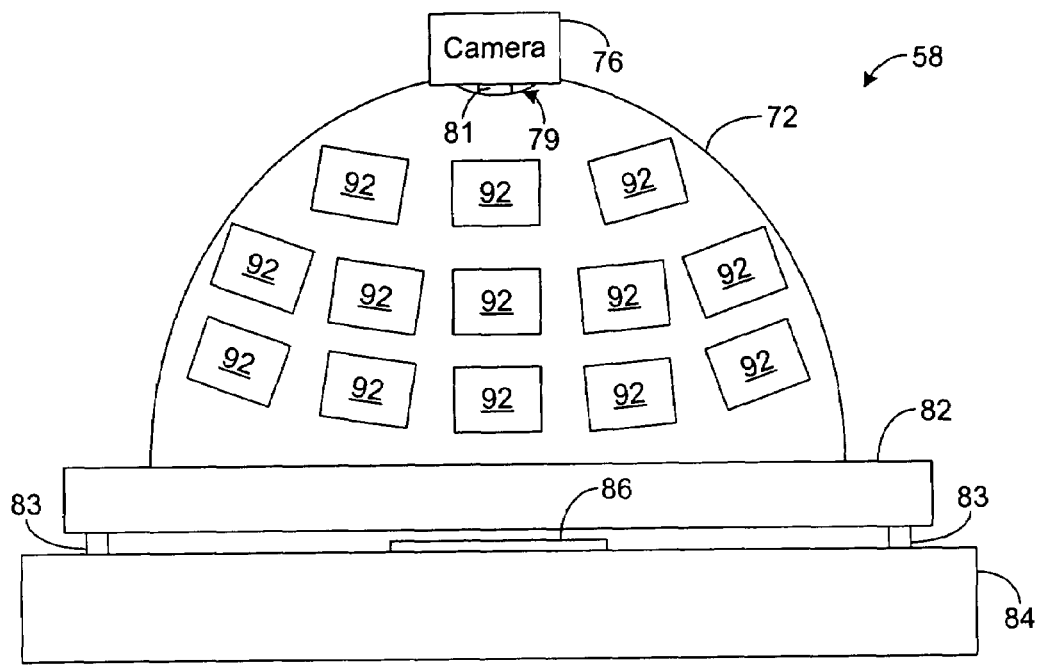
FIG. 2 is a diagram illustrating a side view of an image capture unit, such as is depicted in FIG. 1.
Figure 3:
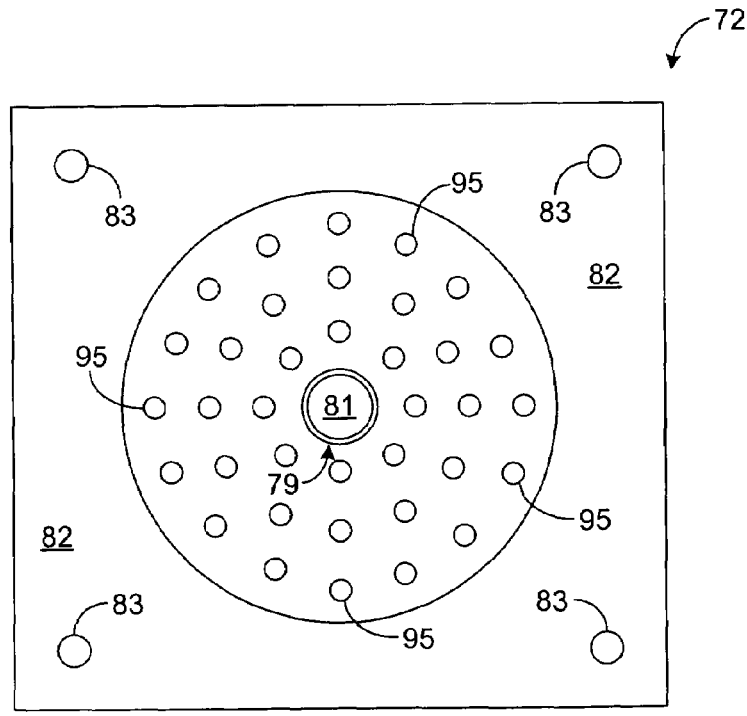
FIG. 3 is a diagram illustrating a bottom view of an image capture unit, such as is depicted in FIG. 2.

FIGS. 2 and 3 depict an exemplary image capture unit 58 that may be utilized to capture images of the sample object 86. In this exemplary embodiment, the image capture unit 58 comprises a dome structure 72 having a digital camera 76 mounted at the top of the structure 72, as shown by FIGS. 2 and 3, although other types of structures may be employed for mounting the camera 76 in other embodiments. In the embodiment depicted by FIGS. 2 and 3, the dome structure 72 has a hole 79 through which a lens 81 of the camera 76 can receive light from the interior of the dome structure 72. Furthermore, the dome structure 72 of FIG. 2 preferably has a base 82 coupled to a plurality of legs 83 for supporting the structure 72 when the structure 72 is placed on another base or structure 84, such as a table or desk, for example. In a preferred embodiment, the length and width of the base 82 is approximately 2.5 feet by 2.5 feet, and the height of the structure 72 is approximately 1.25 feet, although other dimensions of the structure 72 are possible in other embodiments.

A sample object 86 is preferably positioned underneath the dome structure 72, and the lens 81 of the camera 76 preferably points to and is focused on the sample object 86 such that the camera 76 automatically captures an image of the sample object 86 when the camera 76 is instructed to take a picture. As an example, the sample object 86 may be placed on the same structure 84 upon which the dome structure 72 is residing and may be positioned at the center of the structure 72 such that the sample object 86 is directly below the hole 79 and lens 81.

Figure 4:
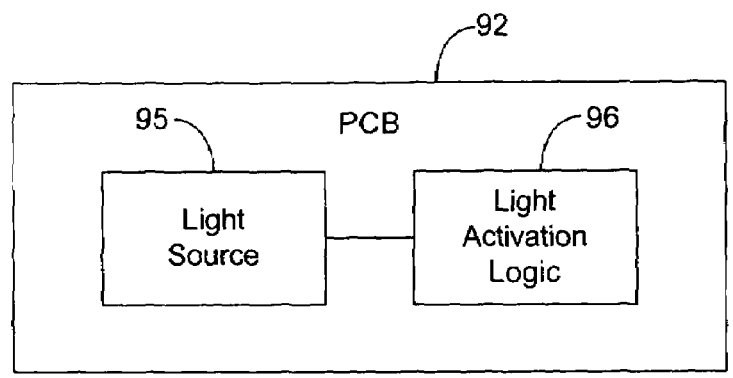
FIG. 4 is a block diagram illustrating a printed circuit board, such as is depicted in FIG. 2.

In the embodiment depicted by FIG. 2, a plurality of printed circuit boards (PCBs) 92 are mounted on the exterior of the dome structure 72. As shown by FIG. 4, each of the PCBs 92 preferably comprises a light source 95 (e.g., a light bulb, a light emitting diode, etc.) and light activation logic 96 for selectively activating and deactivating the light source 95 based on commands from the texture map manager 32. The light source 95 of each PCB 92 preferably extends through the dome structure 72 and is exposed to the interior of the dome structure 72, as shown by FIG. 3, such that light emitted from each of the light sources 95 illuminates the sample object 86. Each of the PCBs 92 and the camera 76 are preferably communicatively coupled to the local interface 51 (FIG. 1) and can exchange data with the texture map manager 32. Note that, if desired, one or more controllers (not shown) on one or more of the PCBs 92 or between the PCBs 92 and the local interface 51 may be employed to control the light sources 95 and/or facilitate communication between the PCBs 92 and the texture map manager 32.

In an image capture phase, the texture map manager 32 periodically transmits, to the camera 76, a command for causing the camera 76 to capture an image of the sample object 86. The images captured by the camera 76 are preferably used to generate the PTM 34 and will be referred to hereafter as "texture images." Furthermore, the command transmitted by the texture map manager 32 for causing the camera 76 to capture a texture image will be referred to hereafter as a "capture image command."

For each capture image command, the texture map manager 32 also transmits, to a different one of the PCBs 92, a command for causing the PCB's logic 96 to activate its corresponding light source 95. Such a command will be referred to hereafter as an "activation command." In response to the activation command, the PCB's logic 96 temporarily activates its corresponding light source 95 causing the light source 95 to flash light that briefly illuminates the sample object 86. The texture map manager 32 preferably controls the timing of the capture image command and the activation command such that the sample object 86 is being illuminated by the light source 95 when the camera 76 captures an image of the sample object 86.

Note that the texture map manager 32 preferably transmits a capture image command and an activation command for each PCB 92. Accordingly, each captured texture image corresponds to an image of the sample object 86 as the sample object 86 is being illuminated by a different one of the light sources 95 and, therefore, from a different direction. Note that the location of each light source 95 may be fixed, and for each texture image, the texture map manager 32 is preferably aware of the angle of incidence of the light that is illuminating the sample object 86. In this regard, the angle of incidence of light from each light source 95 on the sample object 86 may be measured and programmed into the texture map manager 32.

Each texture image captured by the camera 76 is preferably stored in the memory 42 (FIG. 1) of the texture map generating and editing system 30 as a set of texture image data 97. After the texture images are captured, the texture map manager 32 preferably analyzes the texture image data 97 and generates the PTM 34 based on the data 97. More specifically, the texture map manager 32, utilizing known or future-developed techniques, measures or otherwise determines the color of each pixel of each texture image defined by the data 97. The texture map manager 32 may then utilize the measured color values to derive color component values and/or luminosity equations for the texels of the PTM 34.

In this regard, the camera 76 and the sample object 86 preferably remain in a fixed position as the texture images are being captured during the image capture phase. Thus, pixels at the same set of coordinates for different texture images correspond to the same region or point on the sample object's surface. Moreover, each set of coordinates preferably corresponds to a different texel. Furthermore, to determine the color component values for a particular texel of the texture map 34, the texture map manager 32, for each texture image, determines the pixel's luminosity value (e.g., a value indicative of the pixel's color and brightness) at the set of coordinates that correspond to the particular texel. This may be achieved, for example, by identifying the particular set of coordinates for the texel and then retrieving, from each of the texture images, the luminosity value measured for the image's pixel that is located at or mapped to the identified set of coordinates. The manager 32 then averages the retrieved luminosity values to determine an averaged luminosity value for the particular texel. Values indicative of the color components of this averaged value are then utilized as the color component values (R, G, and B) for the particular texel.

To determine the luminosity equation for the particular texel, the texture map manager 32, for each texture image, preferably plots a luminosity value associated with the texel's corresponding set of coordinates. This may be achieved, for example, by identifying the particular set of coordinates for the texel and then retrieving, from each of the texture images, the luminosity value measured for the image's pixel that is located at the identified set of coordinates, as described above for determining the color component values. Each retrieved luminosity value may then be divided by the aforementioned averaged color value to derive a luminosity value (L) that is independent of the pixel's color. This luminosity value (L) may then be plotted as a function of the angle of incidence associated with the retrieved luminosity value.

Figure 5:
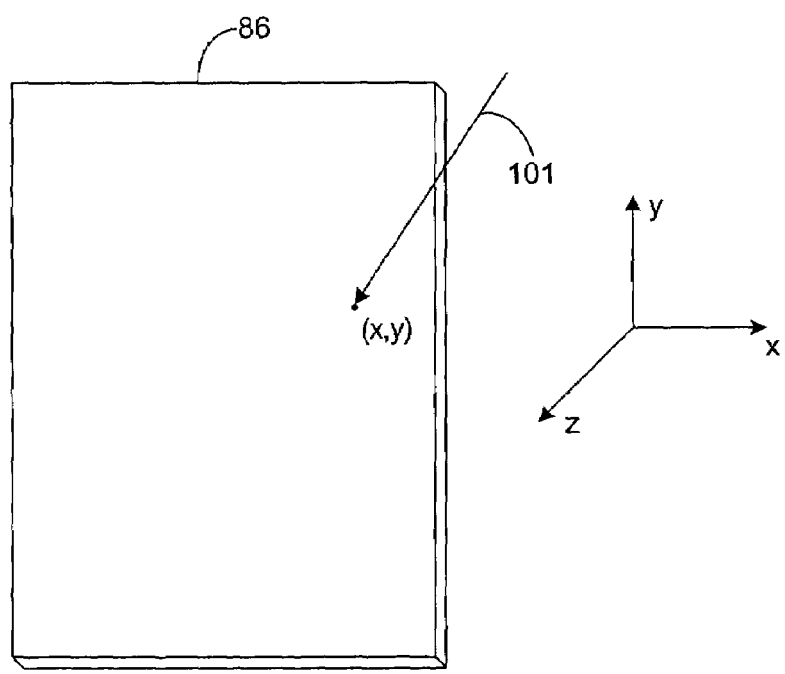
FIG. 5 is a diagram illustrating a three-dimensional view of a sample object that may be positioned underneath a dome structure, such as is depicted in FIG. 2.
Figure 6:
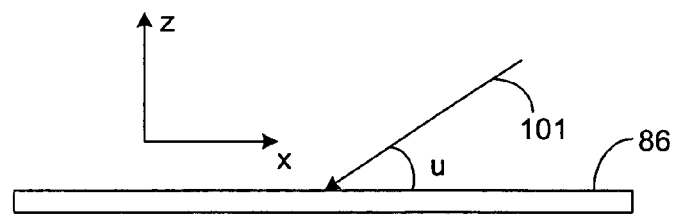
FIG. 6 is a diagram illustrating a side view of the sample object depicted in FIG. 5.
Figure 7:
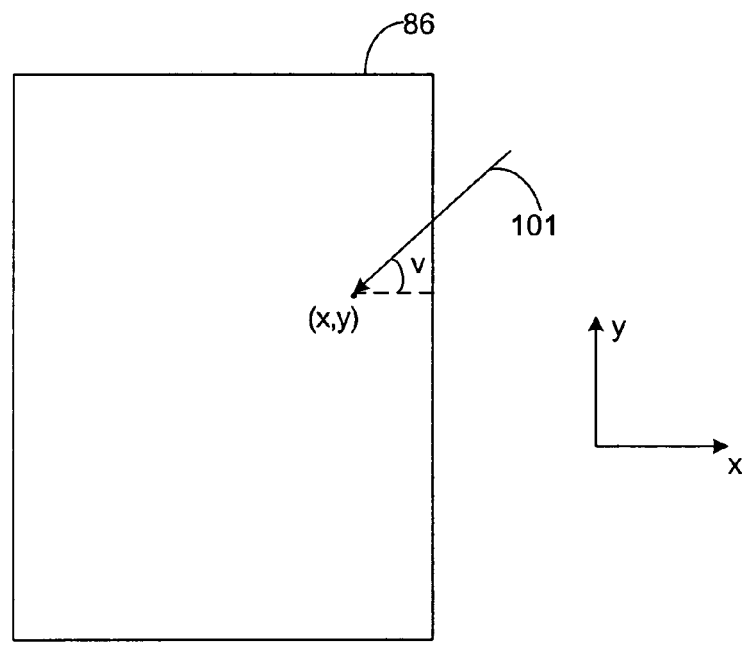
FIG. 7 is a diagram illustrating a top view of the sample object depicted in FIG. 5.

To better illustrate the plotting described above, assume that a texel associated with or mapped to coordinates (x,y) of the sample object 86 is selected. FIG. 5 depicts the sample object 86 wherein an arrow 101 represents the direction of light illuminating the object 86 when the camera 76 (FIG. 2) is capturing one of the texture images defined by the texture data 97 (FIG. 1). In particular, the arrow 101 indicates the direction from which the light source 95 illuminating the object 86 is positioned relative to the object 86. Note that the angle of incidence of the light illuminating the object 86 has two angular components, a "u" component and a "v" component. Each of these components is depicted in FIGS. 6 and 7, respectively.

Figure 8:
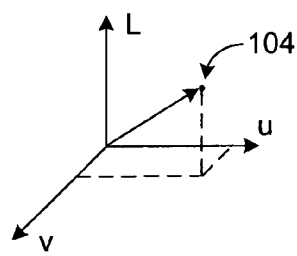
FIG. 8 is a diagram illustrating a three dimensional plot of a data point indicative of a measured luminosity and an angle of incidence for a texel of an image of the sample object depicted in FIG. 5.

Moreover, for the texture image captured in this example, angular components (u) and (v) are known values, and the pixel at coordinates (x,y) is associated with a measured luminosity value ($L_{measured}$) by the set of image data 97 defining the captured image. The measured luminosity value ($L_{measured}$) may be converted into a luminosity value (L) that is indicative of brightness only by dividing the measured luminosity value ($L_{measured}$) by an averaged luminosity value representing the average color of the pixel in the different images defined by the data 97. After determining the foregoing luminosity value (L), a three dimensional plot of (L, u, and v) can be performed, as shown by FIG. 8, in which point 104 represents the plotted value. In a preferred embodiment, such a plot is made for the same pixel (i.e., the pixel at the same set of coordinates) of each texture image captured during the image capture phase.

After performing a plot for the same pixel of each texture image, as described above, the texture map manager 32 preferably fits a three-dimensional curve (which represents an approximation of (L) as a function of (u) and (v)) to the plotted points. In a preferred embodiment, the well-known least squares approximation is employed by the texture map manager 32 to perform a curve fit, although other techniques for curve fitting may be performed in other embodiments. The texture map manager 32 also preferably derives a variable expression, such as an equation, representing the fitted curve or, in other words, representing an approximation of (L). In a preferred embodiment where least squares approximation is utilized for curve fitting, the resulting equation derived by the manager 32 is a bi-quadratic polynomial represented as:

$$L = F(u,v) = Au^2 + Bv^2 + Cuv + Du + Ev + F,$$

where (A, B, C, D, E, and F) are all constants and where (u) and (v) are variables. Note that this equation is representative of the luminosity behavior of the selected texel (i.e., the texel associated with coordinates (x,y)) as a function of (u) and (v), which are angular components of the texel's angle of incidence. Data defining the texel's luminosity equation is preferably stored in memory 42 as a portion of the PTM 34. Moreover, the aforementioned techniques are preferably repeated for each texel such that a luminosity equation, in addition to a set of color component values (R, G, and B), is derived and stored for each texel of the PTM 34.

Figure 9:
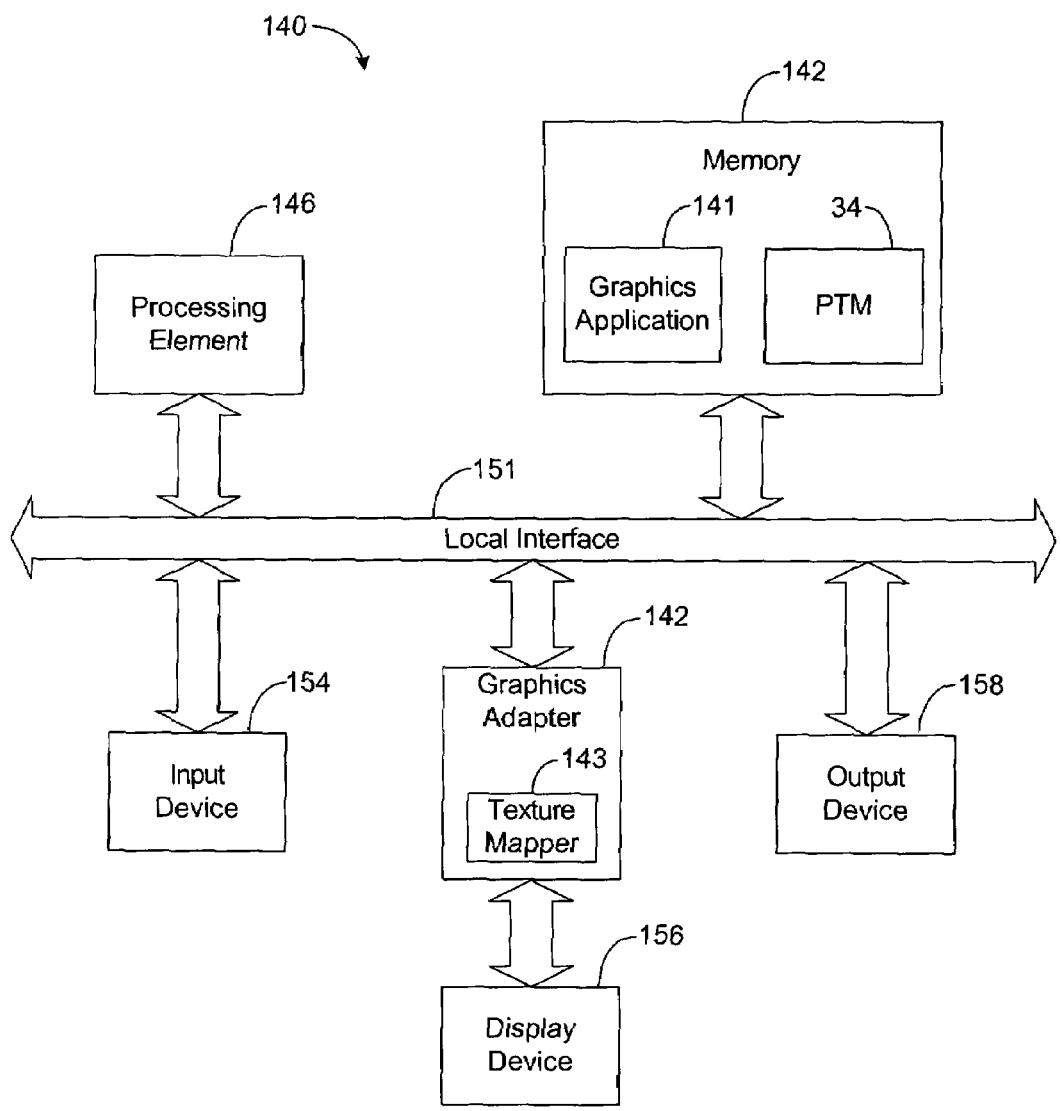
FIG. 9 is a block diagram illustrating a graphical display system in accordance with an exemplary embodiment of the present invention.

Once the texels of the PTM 34 are defined, the PTM 34 may be applied to one or more graphical objects by a graphical display system, such as the system 140 depicted by FIG. 9. Referring to FIG. 9, the system 140 preferably comprises a graphics application 141 having graphical data that defines one or more objects to be rendered by the system 140, and the system 140 preferably comprises a graphics adapter 142 for rendering the graphical objects defined by the graphics application 141. This graphics adapter 142 preferably comprises a texture mapper 143 for applying, to an object's surface, the PTM 34 generated and/or edited by the system 30 (FIG. 1) described above. Note that the graphics application 141 and the graphics adapter 142, including the texture mapper 143, may be implemented in software, hardware, or any combination thereof.

A preferred embodiment of the graphical display system 140 of FIG. 9 comprises one or more conventional processing elements 146, such as a digital signal processor (DSP) or a central processing unit (CPU), that communicate to and drive the other elements within the system 140 via a local interface 151, which can include one or more buses. Furthermore, an input device 154, for example, a keyboard or a mouse, can be used to input data from a user of the system 140, and an output device 158, for example, a screen display or a printer, can be used to output data to the user. The adapter 152 is coupled to and renders to a display device 156.

During operation, the graphics adapter 142 preferably receives graphical data (e.g., primitives) from the graphics application 141 and renders the graphical data to the display device 156. When a graphical object is being rendered by the graphics adapter 142, the texture mapper 143 may apply the texture defined by the PTM 34 to the surface of the graphical object. For illustrative purposes, assume that a graphical object being rendered by the graphics adapter 142 has a surface, referred to hereafter as the "textured surface," to which the texture of the PTM 34 is to be applied.

For each pixel of the textured surface, the texture mapper 143, based on the coordinates of the pixel, maps the pixel to one or more texels of the PTM 34. As set forth above, each texel of the PTM 34 of a preferred embodiment is associated with a luminosity equation in addition to color component values. Moreover, if a single texel is mapped to a pixel of the textured surface, the texture mapper 143 preferably calculates a luminosity value (L) for the mapped texel based on the texel's luminosity equation.

To calculate such a luminosity value (L), the texture mapper 143 determines the direction that light illuminates the pixel or, in other words, determines the values of (u) and (v) for the pixel. In this regard, the graphics application 141 preferably specifies a light source direction indicative of a direction of light that is illuminating the primitives generated by the graphics application 141. For each primitive, the graphics application 141 also preferably provides data indicative of the primitive's orientation and, more specifically, indicative of a direction that is perpendicular to the primitive's surface. This data is sometimes referred to as a "primitive normal." Knowing the light direction and the primitive normal, the texture mapper 143 may calculate the angle of incidence of the light for the primitive or, in other words, may calculate the primitive's (u) and (v) values. The texture mapper 143 may then substitute these values for the variables (u) and (v), respectively, in the luminosity equation being utilized to calculate the luminosity value being applied to the pixel. Once this is done, all of the values except (L) in the luminosity equation are known, and the texture mapper 143 can, therefore, solve the equation for (L).

In the present embodiment, the calculated luminosity value (L) is a value indicative of the texel's brightness only and is independent of the mapped pixel's color. Thus, to derive the color values of the texel, the texture mapper 143 preferably combines the calculated luminosity value (L) with the texel's color component values (R, G, and B) stored in the PTM 34.

More specifically, the texture mapper 143 preferably multiplies the calculated luminosity value (L) to each color component value (R, G, and B) of the texel to generate new color component values, referred to hereafter as "calculated color component values ($R_c$, $G_c$, and $B_c$)." The texture mapper 143 then applies the calculated color component values ($R_c$, $G_c$, and $B_c$) to the mapped pixel according to well-known or future-developed texture mapping techniques. In this regard, the texture mapper 143 may apply the texel's calculated color component values to the mapped pixel according to the same techniques utilized by conventional texture mappers in applying a texel's constant color component values to a mapped pixel.

If multiple texels of the PTM 34 are mapped to the pixel of the textured surface, then the texture mapper 143 is preferably designed to interpolate new color component values (R', G', and B') and a new luminosity equation (L') based on the color component values and the luminosity equations of the mapped texels. In this regard, it is common for conventional texture mappers to interpolate a texture value for a pixel based on the texture values of a plurality of texels mapped to the pixel.

These same interpolation techniques may be employed by the texture mapper 143 to interpolate the new color component values (R', G', and B') based on the corresponding color components (R, G, and B) from the mapped texels.

Furthermore, each luminosity equation, in a preferred embodiment, comprises a set of constants (A, B, C, D, E, and F). The texture mapper 143 preferably utilizes the constants of the luminosity equations of the mapped texels to derive a new set of constants (A', B', C', D', E', and F') for the luminosity equation being interpolated by the mapper 143.

For example, the mapper 143 may be configured to interpolate a new constant (A') based on the corresponding constant (A) from each of the luminosity equations of the mapped texels. As noted above, it is common for conventional texture mappers to interpolate a color value for a pixel based on the color values of a plurality of texels mapped to the pixel. Such interpolation techniques may be employed, by the texture mapper 143, to interpolate (A') based on the corresponding constant (A) from the luminosity equations of the mapped texels. Further note that each of the constants (B', C', D', E', and F') may be similarly interpolated based on the corresponding constants (B, C, D, E, and F), respectively, from the luminosity equations of the mapped texels.

Once the new set of constants (A', B', C', D', E', and F') is determined, the new luminosity equation is defined and may be expressed as:

$$L'=F(u,v)=A'u^2+B'v^2+C'uv+D'u+E'v+F',$$

where (u) and (v) are variables representing the angular components of the angle of incidence of the light illuminating the pixel. After determining this new luminosity equation and the values of (u) and (v), the texture mapper 143 preferably calculates a luminosity value (L') based on the new luminosity equation. The texture mapper 143 preferably multiplies each of the new color component values (R', G', and B') by the calculated luminosity value (L') to generate a calculated set of color component values ($R_c$, $G_c$, and $B_c$) and then applies the calculated color component values to the mapped pixel. In applying the calculated color component values ($R_c$, $G_c$, and $B_c$) to the mapped pixel, the texture mapper 143 may utilize the same techniques employed by conventional texture mappers in applying a texel's color component values to a mapped pixel.

It should be noted that various modifications may be made to the embodiments described above without departing from the principles of the present invention. For example, in the embodiment described above, each texel of a PTM 34 comprises color component values (R, G, and B) and a luminosity equation (L). Furthermore, when applying a texel to a pixel, the texture mapper 143 generally calculates (L) based on light position and multiplies each color component value (R, G, and B) by the calculated value (L). However, if desired, the color component values (R, G, and B) may be respectively combined (e.g., multiplied) with the luminosity equation (L) to generate three new luminosity equations ($L_{red}$, $L_{green}$, and $L_{blue}$), referred to hereafter as "color component luminosity equations." Each of the color component luminosity equations may then be stored in the PTM 34 to define a texel in lieu of the color component values (R, G, and B) and the single luminosity equation (L).

During texture mapping, each of the color component luminosity equations ($L_{red}$, $L_{green}$, and $L_{blue}$) may be solved based on light direction in the same way that the luminosity equation (L) is solved in the embodiment previously described above. Solving the color component luminosity equations generates three color component luminosity values ($L_{red}$, $L_{green}$, and $L_{blue}$). Note that each of the color component luminosity values ($L_{red}$, $L_{green}$, and $L_{blue}$), similar to the calculated color component values ($R_c$, $G_c$, and $B_c$) described above, is a value indicative of one of the texel's color components that is to be applied to the mapped pixel. In this regard, the color component luminosity values ($L_{red}$, $L_{green}$, and $L_{blue}$) are indicative of both brightness and color. Moreover, the color component luminosity values ($L_{red}$, $L_{green}$, and $L_{blue}$) may be applied to the mapped pixel in the same way that conventional texture mappers apply the constant color component values of a texel of a conventional texture map to a corresponding pixel.

It should be noted that defining multiple color component luminosity equations ($L_{red}$, $L_{green}$, and $L_{blue}$) for each texel likely requires more data than defining three color component values (R, G, and B) and a single luminosity equation (L) for each texel. Therefore, in some embodiments, it may be desirable to define the texels of a PTM 34 with color component values (R, G, and B) and a luminosity equation (L) according to previously described embodiments.

However, in some embodiments, utilizing color component luminosity equations may help to improve texture mapping results. In this regard, in generating a PTM 34, the texture map manager 32 may be configured to subdivide the sample color value measured for each image into color components (e.g., red, green, and blue). More specifically, the texture map manager 32, when analyzing the texture image data 97, may measure or otherwise determine the luminosity of each color component. Then, for each texel, the texture map manager 32 may determine a color component luminosity equation for each color component rather than a single luminosity equation (L), as previously described above.

Note that in determining color component luminosity equations ($L_{red}$, $L_{green}$, and $L_{blue}$) in such an embodiment, the texture map manager 32 may employ techniques similar those described above in a preferred embodiment for determining a texel's luminosity equation (L). For example, to determine a red color component luminosity equation ($L_{red}$) for a texel, the texture map manager 32 (FIG. 1) may measure a red luminosity value ($L_{red}$) for the corresponding pixel in each digital image defined by the texture image data 97. The manager 32 may then plot each measured red luminosity value ($L_{red}$) as a function of the angle of incidence associated with the measured red luminosity value, similar to how the manager 32 in the previously described embodiment plots (L) as a function of the angle of incidence associated with (L). However, note that ($L_{red}$) in the present embodiment is a value indicative of both color and brightness, whereas (L) in the previously described embodiment is indicative of brightness only.

After plotting ($L_{red}$) for the corresponding pixel in each image defined by the texture data 97, the texture map manager 32 may fit a three-dimensional curve to the plotted points and derive an equation ($L_{red}$) of this curve. Such an equation represents an approximation of the texel's luminosity behavior for the red color component and may be expressed as:

$$L_{red}=F(u,v)=(A_{red})u^2+(B_{red})v^2+(C_{red})uv+(D_{red})u+(E_{red})v+F_{red}.$$

Similar techniques may be employed to determine color component luminosity equations for the other color components of the texel. For example, when the other color components are blue and green, the luminosity equations for the other color components may be expressed as:

$$L_{blue}=F(u,v)=(A_{blue})u^2+(B_{blue})v^2+(C_{blue})uv+(D_{blue})u+(E_{blue})v+F_{blue};$$

and $$L_{green}=F(u,v)=(A_{green})u^2+(B_{green})v^2+(C_{green})uv+(D_{green})u+(E_{green})v+F_{green}.$$

Moreover, in the present embodiment, each texel of the PTM 34 may comprise a different luminosity equation ($L_{red}$, $L_{blue}$, or $L_{green}$) for each color component. Each of these equations may then be used, as described above, to apply a color component of the texel to a corresponding pixel.

Note that when color component luminosity equations are separately generated by the manager 32 as just described above, the luminosity behavior of each color component may be different. In other words, the red color component of a texel may appear to respond to changes in light direction in a different manner than the other color components of the texel. Such an effect may help to enhance the realism of the texture defined by the PTM 34.

It should also be noted that, in a preferred embodiment, as described above, the luminosity equations, including the color component luminosity equations, are represented as bi-quadratic polynomials. However, in other embodiments, the luminosity equations may be defined by other types of equations. For example, if desired, bi-cubic polynomials could be utilized to express the luminosity equations. In such embodiments, similar techniques as those described above for the aforedescribed embodiments may be employed in order to determine and apply luminosity values to different pixels.

To better illustrate the texture map generation and texture mapping processes described above, assume that the graphics application 141 (FIG. 9) comprises graphical data defining an image of a car seat. Further assume that it is desirable for a viewer to see an image of the car seat as if the car seat is covered in a particular fabric.

In a preferred embodiment, a sample of the fabric is positioned underneath the dome structure 72 of FIG. 2 and below the camera 76. Once this occurs, the user preferably submits an input, via input device 54 (FIG. 1), indicating that the image capture phase may commence.

Figure 10:
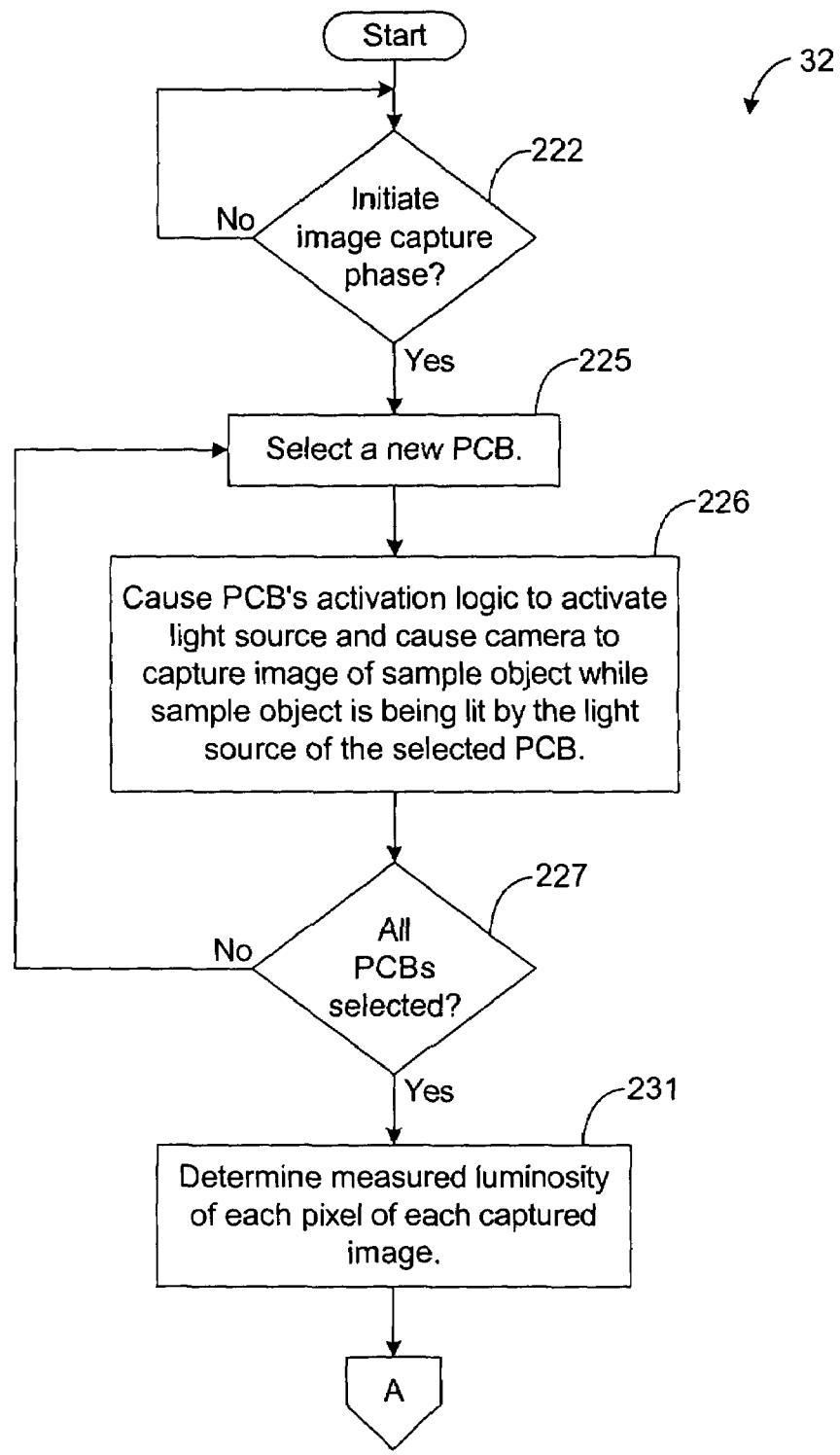
FIGS. 10 and 11 illustrate a flow chart depicting an exemplary process for generating a PTM in accordance with an exemplary embodiment of the present invention.

In response, the texture map manager 32 selects a PCB 92, as shown by blocks 222 and 225 of FIG. 10. The texture map manager 32 then transmits an activation command to the selected PCB 92 and transmits an image capture command to the camera 76 such that the camera 76 takes a picture of the sample object 86 (i.e., the sample fabric) as the object 86 is being illuminated by the light source 95 of the selected PCB 92, as shown by block 226. Once the image of the object is captured, the camera 76 preferably stores the captured image in memory 42 (FIG. 1) as a set of texture image data 97. Note that an image captured by a PCB 92 is associated with a particular set of (u) and (v) values representing the angular components of the angle of incidence that the light from the PCB's light source 95 illuminates the object 86. The (u) and (v) values may be predefined values stored in the system 30.

As an example, a user may physically measure or estimate the direction or angle from which the PCB's light source 95 illuminates the sample object 86. The user may then program the (u) and (v) components values into the texture map manager 32. Then, when the camera 76 captures an image of the object 86, which the PCB's light source 95 is illuminating, the texture map manager 32 may associate the programmed (u) and (v) values with the captured image.

After the image is captured, the texture map manager 32 preferably selects another PCB 92 and repeats the aforedescribed techniques, as shown by blocks 225–227, such that another image is captured as the object 86 is being illuminated from a different direction by the light source 95 of another PCB 92. As shown by block 231, the texture map manager 32 preferably measures or otherwise determines the luminosity of each pixel within each of the texture images defined by the texture image data 97. These measured luminosity values may then be used to determine color component values and luminosity equations for the different texels of the PTM 34.

Figure 11:
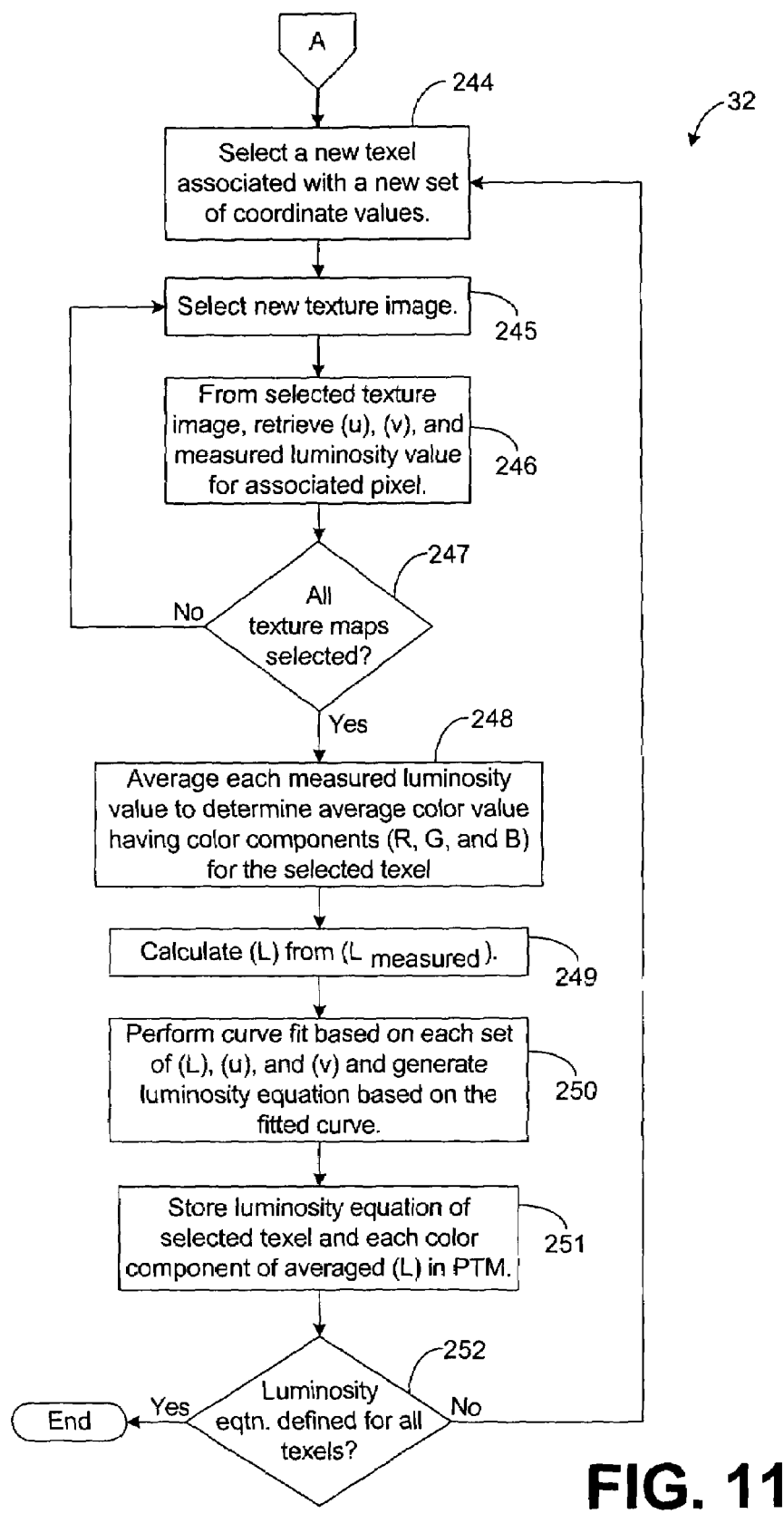

In this regard, the texture map manager 32, in block 244 of FIG. 11, preferably selects a new texel, which is associated with a particular set of coordinate values. Then, in block 245, the texture map manager 32 selects a new texture image defined by the data 97. For this selected texture image, the texture map manager 32 retrieves, in block 246, the measured luminosity value ($L_{measured}$) for the pixel that is located at the particular set of coordinate values associated with the texel selected in block 244. In block 246, the texture map manager 32 also retrieves the (u) and (v) values associated with the texture image selected in block 245.

After retrieving a set of ($L_{measured}$), (u), and (v) values in block 246, the texture map manager 32 selects another texture image and repeats blocks 245 and 246. As shown by blocks 245–247, the texture map manager 32 continues to repeat blocks 245 and 246 for different texture images until block 246 has been performed for all of the texture images defined by the data 97.

As shown by block 248, the texture map manager 32 then calculates an average, referred to hereafter as the "averaged (L)," of the measured luminosity values ($L_{measured}$) retrieved via block 246. The color components of the averaged (L) are preferably utilized as the color components (R, G, and B) of the selected texel. Further, in block 249, each measured luminosity value ($L_{measured}$) retrieved in block 246 is converted into a luminosity value (L) by dividing the measured luminosity value ($L_{measured}$) by the averaged (L). This luminosity value (L) is indicative of brightness only, although the luminosity value (L) calculated in block 249 may be indicative of other parameters in other embodiments.

As shown by block 250, the texture map manager 32 performs a curve fit, using each set of (L), (u), and (v) values derived from a single texture image as a different data point, and the texture map manager 32, based on this curve fit, determines an equation for the fitted curve. This equation is the luminosity equation for the PTM texel selected in block 244 and is stored in the PTM 34 in block 251 along with the color component values of the selected texel.

After defining and storing the luminosity equation and color component values for one texel of the PTM 34 via blocks 244–251, the texture map manager 32 repeats blocks 244–251 for another texel that is associated with another set of coordinates. Indeed, the texture map manager 32 preferably repeats blocks 244–251 for each different texel of the PTM 34. Once a luminosity equation has been defined for each texel of the PTM 34 in this way, the PTM 34 is complete, and the process of generating the PTM 34 preferably ends, as shown by block 252.

Figure 12:
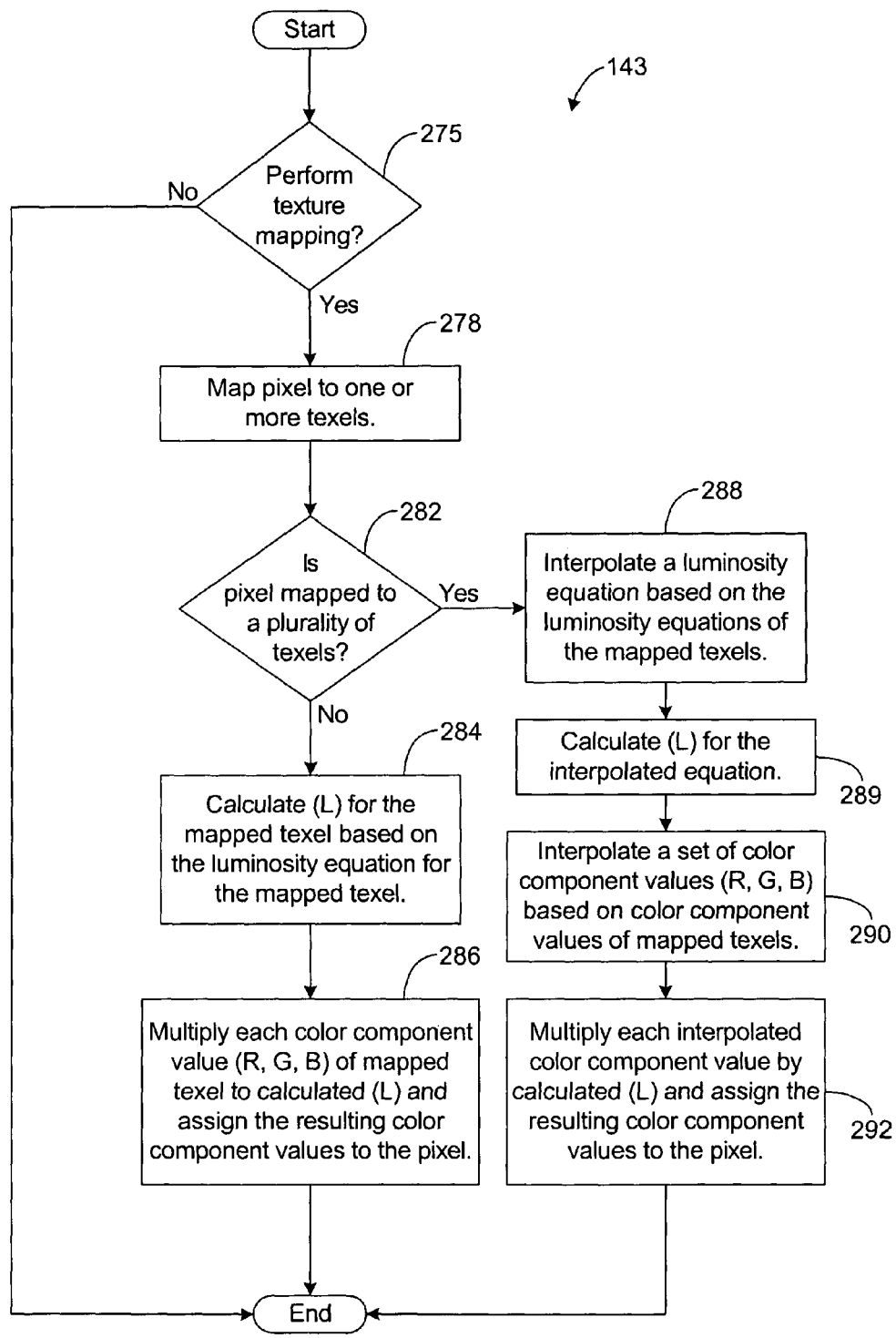
FIG. 12 illustrates a flow chart depicting an exemplary process for performing texture mapping in accordance with an exemplary embodiment of the present invention.

After the PTM 34 has been generated, the PTM 34 may be stored and used by the graphical display system 140 of FIG. 9. In this regard, continuing with the illustrative car seat example, the graphics application 141 may generate primitives defining the car seat. When the graphics adapter 142 is rendering a pixel of the car seat's surface, the texture mapper 143 preferably applies the PTM 34 to the pixel. More particularly, when rendering the pixel, the texture mapper 143 determines, in block 275 of FIG. 12, determines whether to perform the texture mapping methodology of FIG. 12 by determining whether the pixel defines a portion of the car seat surface defined by the PTM 34. If so, the texture mapper 143 maps one or more texels of the PTM 34 to the pixel, as shown by block 278.

If a single texel is mapped to the pixel, then the mapper 143 calculates a luminosity value (L) from the mapped texel's luminosity equation stored in the PTM 34, as shown by blocks 282 and 284. Note that this luminosity value is based on the angle of incidence for the light that illuminates the pixel. As set forth above, this angle of incidence may be determined from data provided by the graphics application 141. After calculating a luminosity value (L) from the mapped texel's luminosity equation, the mapper 143 multiplies each of the color component values (R, G, and B) of the mapped texel by the calculated luminosity value (L) to generate a set of calculated color component values ($R_c$, $G_c$, and $B_c$), as shown by block 286. Also in block 286, the texture mapper 143 applies or assigns the calculated color component values ($R_c$, $G_c$, and $B_c$) to the pixel.

If multiple texels of the PTM 34 are mapped to the pixel in block 278, then the texture mapper 143 is preferably designed to interpolate a new luminosity equation based on the luminosity equations of the mapped texels, as shown by blocks 282 and 288. After interpolating a new luminosity equation in block 288, the texture mapper 143 calculates a luminosity value (L) from the interpolated luminosity equation, as shown by block 289. Note that this luminosity value is based on the angle of incidence for the light that illuminates the pixel.

As shown by block 290, the mapper 143 interpolates a set of color component values (R, G, and B) based on the color component values of the mapped texels. The mapper 143 then multiples each of the interpolated color component values by the calculated luminosity value (L) to generate a set of calculated color component values ($R_c$, $G_c$, and $B_c$), as shown by block 292. Also in block 292, the mapper 143 applies or assigns the calculated color component values ($R_c$, $G_c$, and $B_c$) to the pixel.

After color component values are assigned to the pixel in block 286 or 292, the pixel is rendered by the graphics adapter 142. The display device 156 then displays the pixel based on the color component values assigned to the pixel by the texture mapper 143.

Note that, as the texture mapper 143 receives more primitives of the car seat's surface, tiling techniques may be employed to apply the PTM 34 across the surface of the car seat. Tiling techniques for applying a texture map across the surface of a graphical object are generally well-known in the art.

Once each of the pixels of the car seat is rendered by the graphics adapter 142, the display device 156 displays an image of the car seat. This displayed car seat appears to be covered with the fabric from which the texture image data 97 is based. In other words, the displayed car seat appears to be covered with the fabric (i.e., the sample object 86) positioned underneath the dome structure 72 (FIG. 2).

Furthermore, by defining the luminosity equations as a function of light direction, as described above, the luminosity equations take into account the phenomena that different point elements of the sample fabric may appear to respond to changes in light direction differently. Thus, utilization of the luminosity equations to calculate the color values that are applied to the car seat by the texture mapper 143 helps to create a more realistic image of the car seat.

It should be noted that, in a preferred embodiment, the user of the system 140 may submit an input, via input device 154, for changing the direction from which the graphical object (e.g., the car seat) is being illuminated. For example, the user may submit an input for moving a simulated light source illuminating the graphical object from one model position to a different model position. In response to such an input, the graphics application 141 preferably calculates a new angle of incidence for each primitive of the graphical object based on the new position of the light source relative to the graphical object. According to the aforedescribed rendering process, the new angle of incidence affects the luminosity values calculated from the luminosity equations in blocks 284 and 289 of FIG. 12. More specifically, a different angle of incidence may cause the texture mapper 143 to calculate a different luminosity value (L) from the same luminosity equation.

Figure 13:
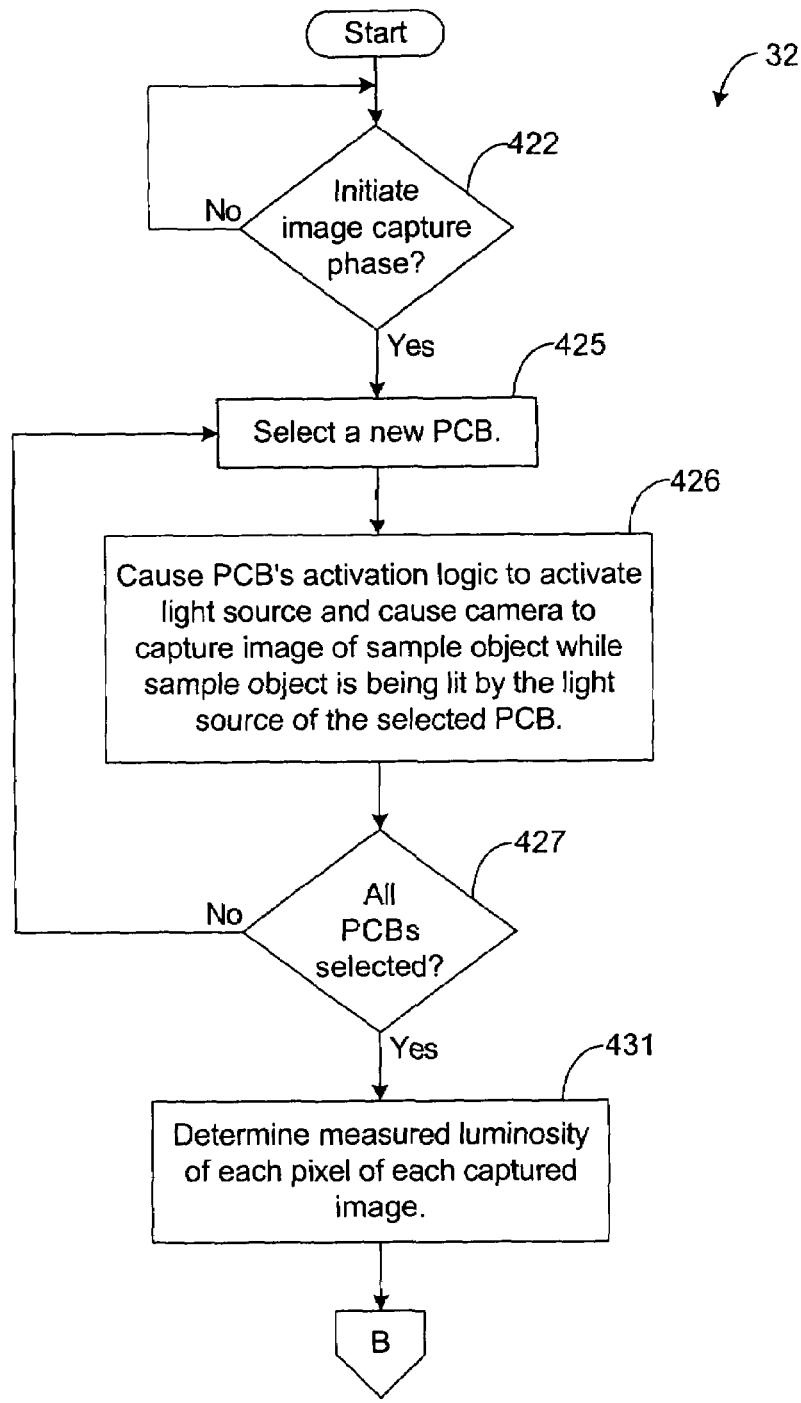
FIGS. 13 and 14 illustrate a flow chart depicting an exemplary process for generating a PTM having color component luminosity equations in accordance with an exemplary embodiment of the present invention.
Figure 14:
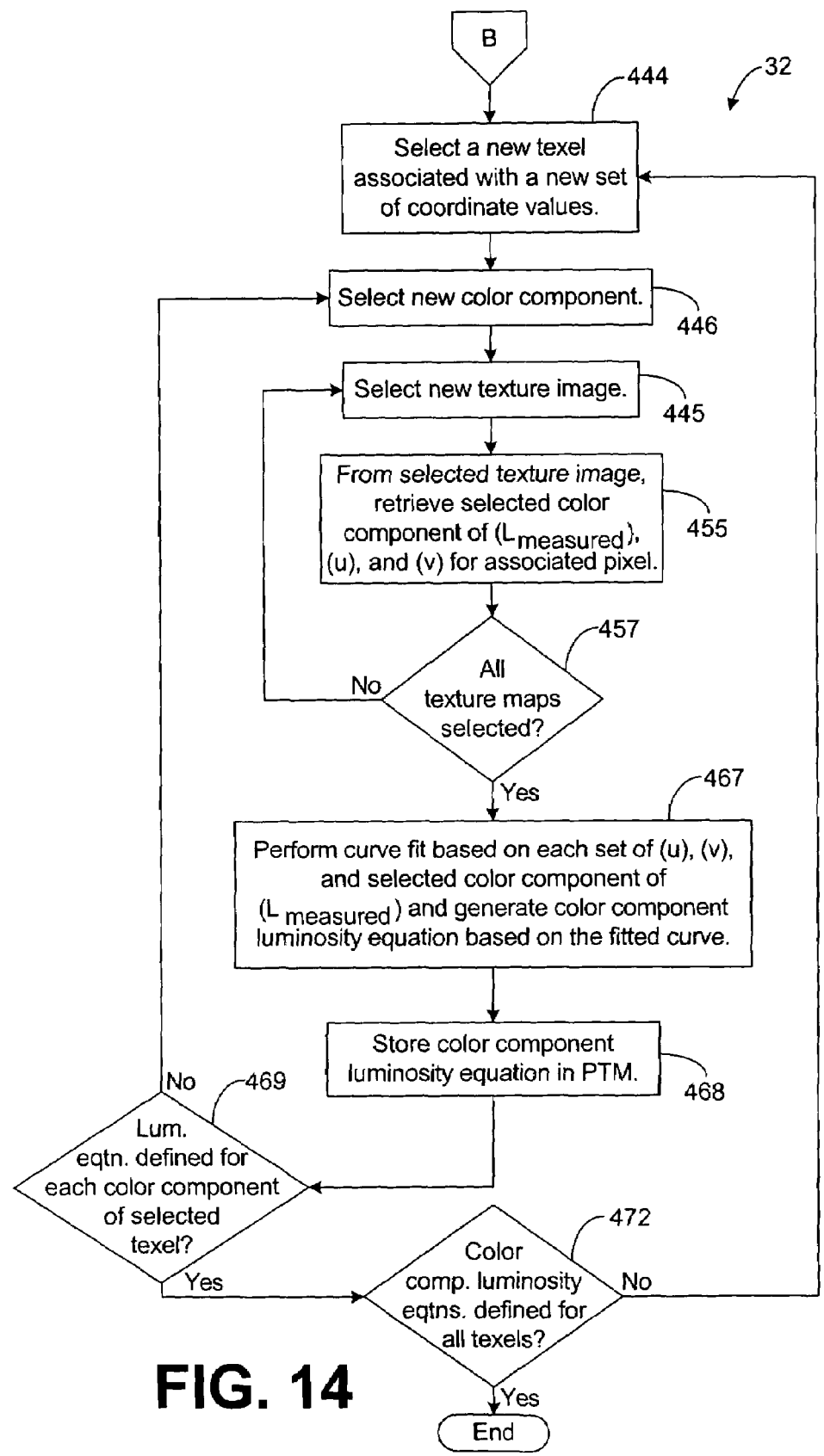

FIGS. 13 and 14 depict an exemplary process for generating a PTM 34 having texels defined by color component luminosity equations ($L_{red}$, $L_{green}$, and $L_{blue}$). As can be seen by comparing FIGS. 13 and 14 to FIGS. 10 and 11, the foregoing process may be similar to the PTM generation process depicted by FIGS. 10 and 11. Indeed, blocks 422, 425, 426, 427, 431, and 444 of FIGS. 13 and 14 are respectively the same as blocks 222, 225, 226, 227, 231, and 244 of FIGS. 10 and 11. However, in the process depicted by FIGS. 13 and 14, the texture map manager 32, after performing block 444, selects a color component (e.g., red, green, or blue) in block 446. Then, after selecting a new texture image in block 445, the texture map manager 32, in block 455, retrieves the selected component of the measured luminosity value ($L_{measured}$) for the pixel that is located at the set of coordinate values associated with the texel selected in block 444. The texture map editor 32 also retrieves the angular components (u) and (v) for the angle of incidence of the texture image selected in block 455. Note, in particular, that the luminosity value retrieved in block 455 is a color component of the overall luminosity value measured for the associated pixel.

For example, if the red color component is selected in block 446, then the manager 32 preferably retrieves the red color component of the measured luminosity value ($L_{measured}$). Therefore, the luminosity equation generated in block 467 and stored in block 468 after a "yes" determination in block 457 preferably corresponds to a representation of the luminosity behavior of the selected color component only. As depicted by block 469, the aforedescribed process for defining and storing a color component luminosity equation for the selected texel is repeated for each different color component of the selected texel. Further, as shown by block 472, the process depicted by FIG. 14 continues until color component luminosity equations have been defined for all texels. Moreover, once the process depicted by FIGS. 13 and 14 is completed, each texel preferably comprises color component equations ($L_{red}$, $L_{green}$, and $L_{blue}$). Note that changes to the aforedescribed algorithm depicted by FIGS. 13 and 14 or different algorithms may be implemented to generate a PTM 34 in other examples.

Figure 15:
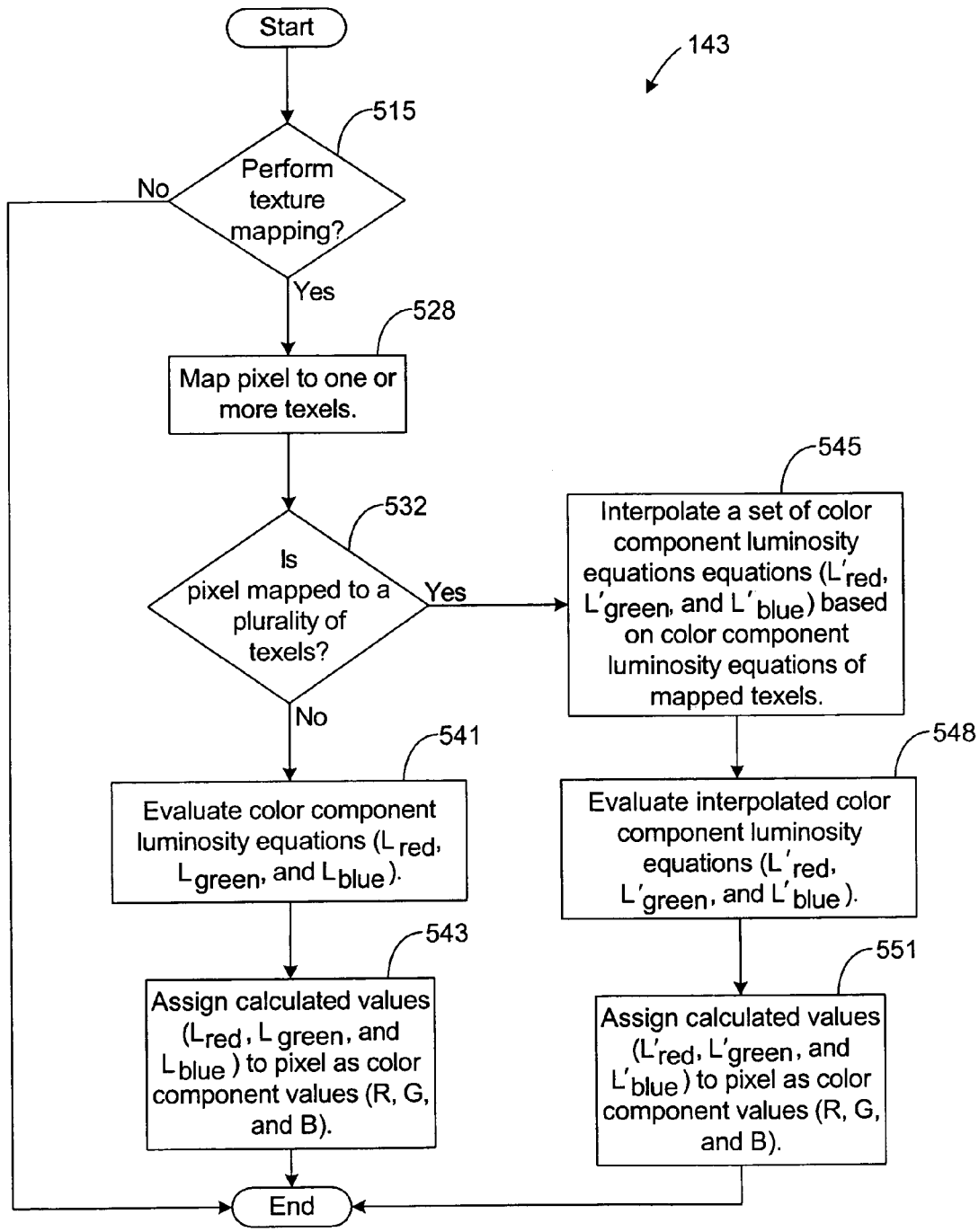
FIG. 15 illustrates a flow chart depicting an exemplary process for performing texture mapping in accordance with an exemplary embodiment of the present invention.

FIG. 15 depicts an exemplary process for applying a PTM 34, such as one generated by the process depicted by FIGS. 13 and 14, that has texels defined by color component luminosity equations ($L_{red}$, $L_{green}$, and $L_{blue}$). When the graphics adapter 142 is rendering a pixel, the texture mapper 143 preferably applies the PTM 34 to the pixel. In this regard, when rendering the pixel, the texture mapper 143 determines, in block 515, whether to perform the texture mapping methodology of FIG. 15 by dtermining whether the pixel defines a portion of a surface, such as the car seat surface described above, defined by the PTM 34. If so, the texture mapper 143 maps one or more texels of the PTM 34 to the pixel, as shown by block 528.

If a single texel is mapped to the pixel, then the mapper 143 evaluates the color component luminosity equations ($L_{red}$, $L_{green}$, and $L_{blue}$) defined by the mapped texel, as shown by blocks 532 and 541. Note that each color component luminosity equation ($L_{red}$, $L_{green}$, and $L_{blue}$) is based on the angle of incidence for the light that illuminates the pixel. As set forth above, this angle of incidence may be determined from the graphics application 141 in order to calculate color component luminosity values ($L_{red}$, $L_{green}$, and $L_{blue}$) from the color component luminosity equations in block 541. After calculating the color component values ($L_{red}$, $L_{green}$, and $L_{blue}$) in block 541, the mapper 143 applies or assigns the calculated color component values ($L_{red}$, $L_{green}$, and $L_{blue}$) to the pixel, as shown by block 543. In this regard, the mapper 143 assigns the color component luminosity value ($L_{red}$) to the pixel as the pixel's red color component value (R). The mapper 143 also assigns the color component luminosity values ($L_{green}$ and $L_{blue}$) to the pixel as the pixel's green and blue color component values (G and B), respectively.

If multiple texels of the PTM 34 are mapped to the pixel in block 528, then the texture mapper 143 is preferably designed to interpolate a new set of color component luminosity equations ($L'_{red}$, $L'_{green}$, and $L'_{blue}$) based on the color component luminosity equations ($L_{red}$, $L_{green}$, and $L_{blue}$) of the mapped texels, as shown by blocks 532 and 545. This may be achieved by interpolating each constant (A', B', C', D', E', and F') of the interpolated equation based on the corresponding constants (A, B, C, D, E, and F) of the corresponding color component luminosity equations ($L_{red}$, $L_{green}$, and $L_{blue}$) of the mapped texels.

For example, to interpolate the constant ($A_{red}$) of the new red color component equation ($L'_{red}$), the texture mapper 143 may calculate a weighted average (weighted based on the pixel's position relative to the mapped texels) of the constant ($A_{red}$) from each red color component luminosity equation ($L_{red}$) of the mapped texels. Furthermore, the other constants ($B'_{red}$, $C'_{red}$, $D'_{red}$, $E'_{red}$, and $F'_{red}$) of the new red color component luminosity equation ($L'_{red}$) may be respectively interpolated, via similar techniques, from the constants ($B_{red}$, $C_{red}$, $D_{red}$, $E_{red}$, and $F_{red}$) of the red color component luminosity equations ($L_{red}$) of the mapped texels.

After interpolating new color component luminosity equations ($L'_{red}$, $L'_{green}$, and $L'_{blue}$) in block 545, the texture mapper 143 preferably evaluates the interpolated color component luminosity equations ($L'_{red}$, $L'_{green}$, and $L'_{blue}$), as shown by block 548. Note that each interpolated color component luminosity equation ($L'_{red}$, $L'_{green}$, and $L'_{blue}$) is based on the angle of incidence for the light that illuminates the pixel. As set forth above, this angle of incidence may be determined from data provided by the graphics application 141 in order to calculate color component luminosity values ($L'_{red}$, $L'_{green}$, and $L'_{blue}$) from the color component luminosity equations in block 548. After calculating the color component values ($L'_{red}$, $L'_{green}$, and $L'_{blue}$) in block 548, the mapper 143 applies or assigns the calculated color component values ($L'_{red}$, $L'_{green}$, and $L'_{blue}$) to the pixel, as shown by block 551.

After color component values are assigned to the pixel in block 543 or 551, the pixel is rendered by the graphics adapter 142. The display device 156 then displays the pixel based on the color component values assigned to the pixel by the texture mapper 143 in block 543 or 551.

In some situations, it may be desirable to combine at least two texture maps into a single combined texture map. In this regard, a user may desire to replace a portion of a first texture map with a portion of a second texture map. This can be accomplished by replacing some of the texels of the first texture map portion with texels from the second texture map portion. If desired, the same may be done for PTMs 34 generated by the texture mapping system 30 (FIG. 1). In this regard, the texture map manager 32 may be configured to replace a portion of one PTM 34 with a portion of another PTM 34 or of a conventional texture map (not specifically shown in FIG. 1). However, problems may arise when a PTM 34 is combined with another texture map having texel data that is of a different type or form.

In this regard, as described above, the texel data of different texture map types can be represented in different forms. For example, the texel data of a conventional texture map normally comprises constant color component values (R, G, and B) for each texel. In one embodiment described above, the texel data of a PTM 34 comprises constant color component values (R, G, and B) as well as a luminosity equation (L) for each texel. A PTM 34 having texel data in this form shall be referred to hereafter as an "LRGB PTM." In another type of PTM 34 described above, the texel data of a PTM texel comprises color component luminosity equations ($L_{red}$, $L_{green}$, and $L_{blue}$). A PTM 34 having texel data in this form shall be referred to hereafter as an "RGB PTM."

As described above, during operation, interpolation between several luminosity expressions (e.g., equations) is sometimes performed. Moreover, it is generally desirable for the texel data of each texel within a PTM 34 to be expressed in the same form to facilitate interpolation between multiple texels. Thus, when the texture map manager 32 combines a portion of a first texture map (e.g., either a conventional texture map or a PTM) with a PTM 34 of a different type, the manager 32 preferably converts the form of the first texture map portion into a corresponding form relative to the form of the PTM 34.

For example, if the manager 32 is instructed to combine at least a portion of a conventional texture map with at least a portion of an LRGB PTM, the manager 32 preferably converts the texel data of the conventional texture map portion into a form that is consistent with the LRGB PTM (e.g., converts the conventional texture map portion into an LRGB PTM portion). To perform the texture map combination, the manager 32 may either replace the aforementioned portion of the LRGB PTM with the converted portion of the conventional texture map, or the manager 32 may replace the converted portion of the conventional texture map with the aforementioned portion of the LRGB PTM.

Note that the combination of the conventional texture map and the LRGB PTM may occur before or after the conventional texture map portion is converted.

If the manager 32 is instructed to combine at least a portion of a conventional texture map with at least a portion of an RGB PTM, the manager 32 preferably converts the texel data of the conventional texture map portion into a form that is consistent with the RGB PTM (e.g., converts the conventional texture map portion into an RGB PTM portion). To perform the texture map combination, the manager 32 may either replace the aforementioned portion of the RGB PTM with the converted portion of the conventional texture map, or the manager 32 may replace the converted portion of the conventional texture map with the aforementioned portion of the RGB PTM. Note that the combination of the conventional texture map and the RGB PTM may occur before or after the conventional texture map portion is converted.

If the manager 32 is instructed to combine portions of two PTMs 34 of different forms or types (e.g., an LRGB PTM and an RGB PTM), then the manager 32 preferably converts one of the PTM portions of one of the PTMs 34 into a form consistent with the form of the other PTM 34. In a preferred embodiment, the manager 32 selects one of the PTMs for conversion based on which of the PTM forms is represented with more texel information. For example, as previously described above, an RGB PTM preferably defines a different luminosity behavior for each color component of a texel, whereas an LRGB PTM preferably defines a single luminosity behavior for each texel. Therefore, an RGB PTM is represented with more texel information than an LRGB PTM, and the manager 32 preferably selects the LRGB PTM portion, rather than the RGB PTM portion, for conversion. In other embodiments, the manager 32 may instead select the RGB PTM portion for conversion, if desired.

However, note that, if the RGB PTM portion is converted into a form consistent with an LRGB PTM, then some information defined by the RGB PTM may be lost. In particular, each texel of the color component luminosity equations of an RGB PTM portion, when converted into a form consistent with an LRGB PTM, are converted into a single luminosity equation. Therefore, the texel data defines a single luminosity behavior for the entire texel, and information pertaining to how each different color component of the texel behaves in response to light direction changes may be lost, if such information is not maintained separate from the converted PTM.

Moreover, in a preferred embodiment, when the manager 32 is instructed to combine at least a portion of an LRGB PTM with at least a portion of an RGB PTM, the manager 32 converts the texel data of the LRGB PTM portion into a form that is consistent with the RGB PTM (e.g., converts the LRGB PTM portion into an LRGB PTM portion). To perform the texture map combination, the manager 32 may either replace the portion of the RGB PTM with the converted portion of the LRGB PTM, or the manager 32 may replace the converted portion of the LRGB PTM with the aforementioned portion of the RGB PTM. Note that the combination of the LRGB PTM and the RGB PTM may occur before or after the LRGB PTM portion is converted.

To achieve the foregoing results, the texture map manager 32, upon receiving a command to combine two texture map portions, may be configured to determine the texture map types of the two texture map portions identified by the command. The texture map manager 32 may be configured to then prioritize the identified texture map portions based on the determined texture map types. Based on such prioritization, the texture map manager 32 selects one of the texture map portions for conversion into a form compatible with the other texture map.

For example, in a preferred embodiment, the texture map manager 32 may be configured to assign a higher priority to texture map types that are more complex and/or utilize more data to define a luminosity behavior of a texel. In response to a command to combine two texture map portions, the texture map manager 32 may select for conversion the texture map portion of a type that is assigned the lower priority thereby helping to reduce texel information loss due to the conversion.

To better illustrate the foregoing, assume that the texture map manager 32 processes conventional texture maps, LRGB PTMs, and RGB PTMs, as described above. In such an example, an LRGB PTM is generally more complex and utilizes more data to define the luminosity behavior of a particular texel, as compared to conventional texture maps. Further, an RGB PTM is generally more complex and utilizes more data to define the luminosity behavior of a particular texel, as compared to both conventional texture maps and LRGB PTMs. Thus, the texture map manager 32 may be configured to assign conventional texture maps (i.e., the texture map type of the least complexity) the lowest priority and to assign RGB PTMs (i.e., the texture map type of the greatest complexity) the highest priority. The LRGB PTM may be assigned a priority between those of the conventional texture map and LRGB texture map.

Figure 16:
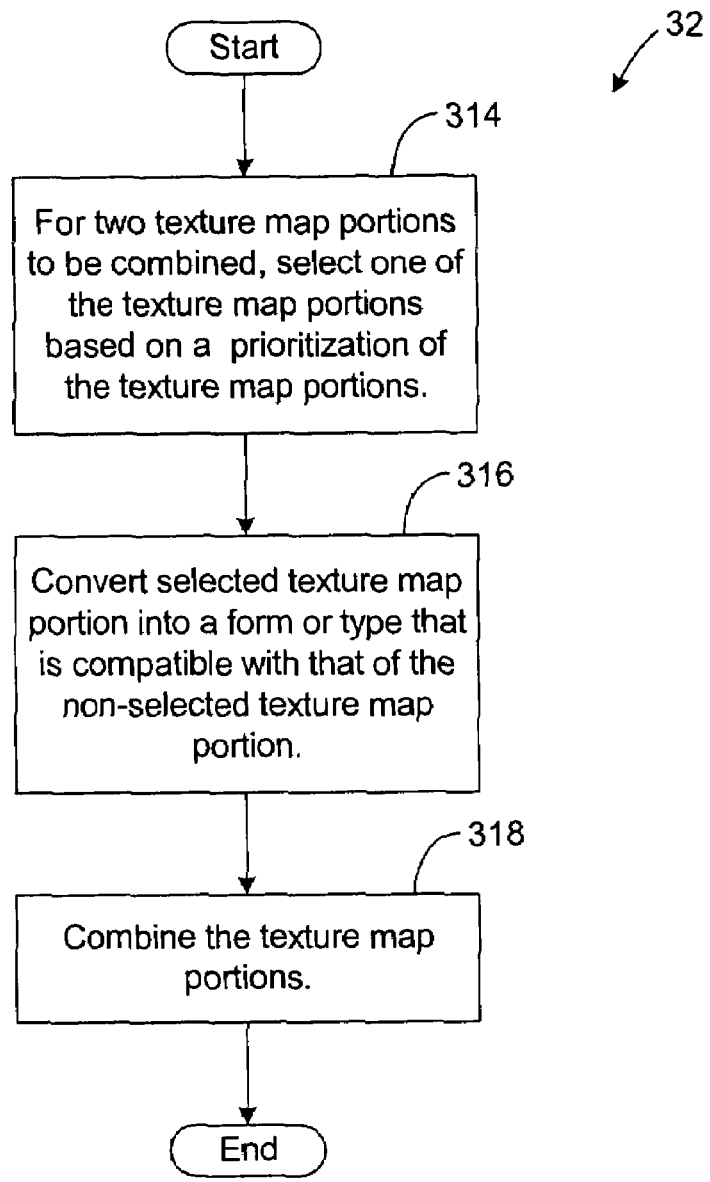
FIG. 16 illustrates a flow chart depicting an exemplary process for combining a parametric texture map with another texture map of a different type.

Thus, referring to FIG. 16, when the manager 32 is instructed to combine at least a portion of an LRGB PTM with at least a portion of an RGB PTM, the manager 32 preferably selects, in block 314, the lower prioritized portion (i.e., the LRGB PTM portion) for conversion and then converts, in block 316, the texel data of the selected LRGB PTM portion into a form that is compatible with the RGB PTM. Further, when the manager 32 is instructed to combine at least a portion of a conventional texture map with at least a portion of either an LRGB PTM or RGB PTM, the manager 32 preferably selects, in block 314, the lower prioritized portion (i.e., the conventional texture map portion) for conversion and then converts, in block 316, the texel data of the selected portion into a form that is compatible with the PTM portion. Accordingly, data loss due to the conversions performed by the texture map manager 32 may be reduced or eliminated. As shown by block 318, the non-converted texture map portion is combined with the texture map portion converted in block 316.

There are a variety of techniques that may be employed to convert a texture map into a different form or type. Exemplary techniques for converting texture maps into various forms or types will be described in further detail below.

Figure 17:
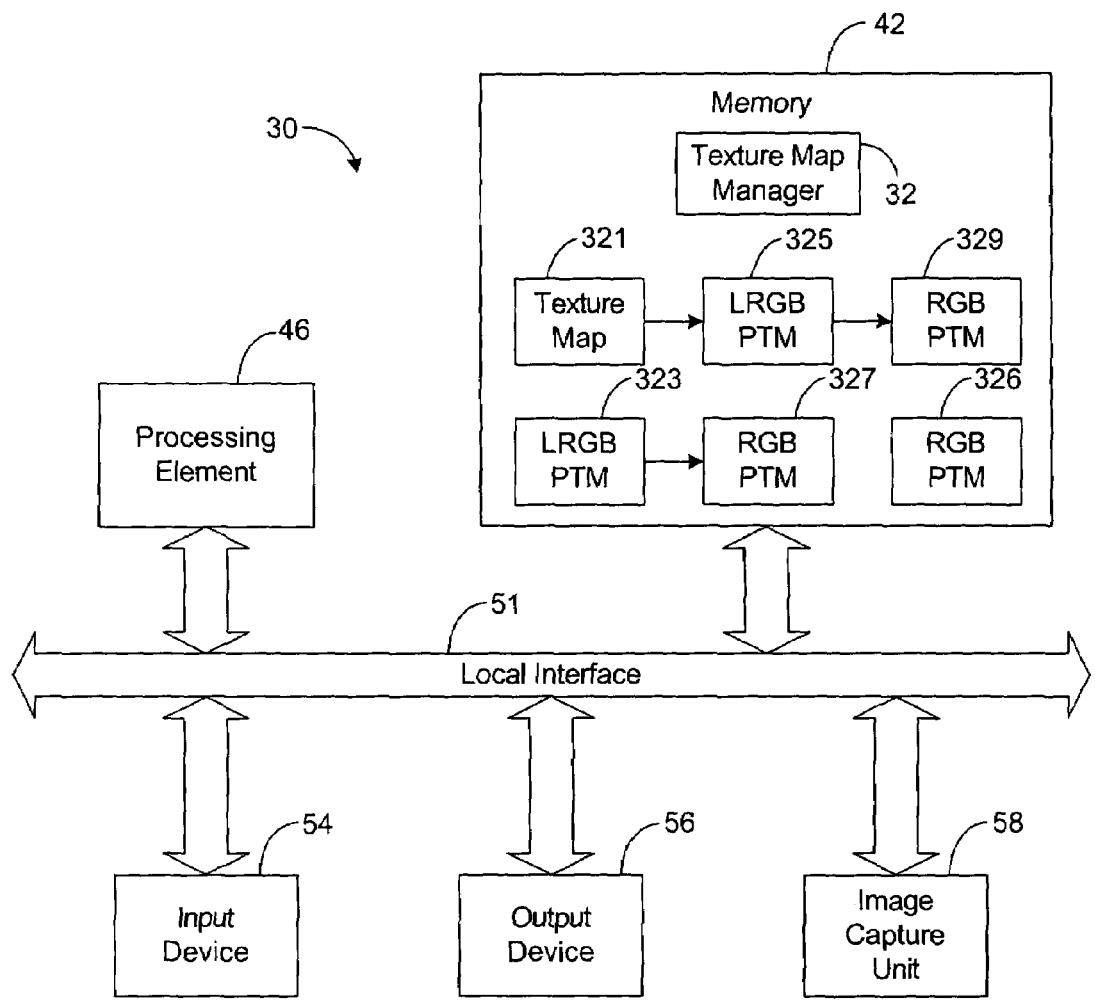
FIG. 17 is a block diagram illustrating a texture map generating and editing system in accordance with an exemplary embodiment of the present invention.

Referring to FIG. 17, assume that a portion of a conventional texture map 321 is to be combined with an LRGB PTM 323. In such an example, it may be desirable to convert the conventional texture map portion into a form consistent with the LRGB PTM 323. Thus, the manager 32 may be configured to convert the portion of the conventional texture map 321 into an LRGB PTM 325 and then combine the LRGB PTMs 323 and 325.

Figure 18:
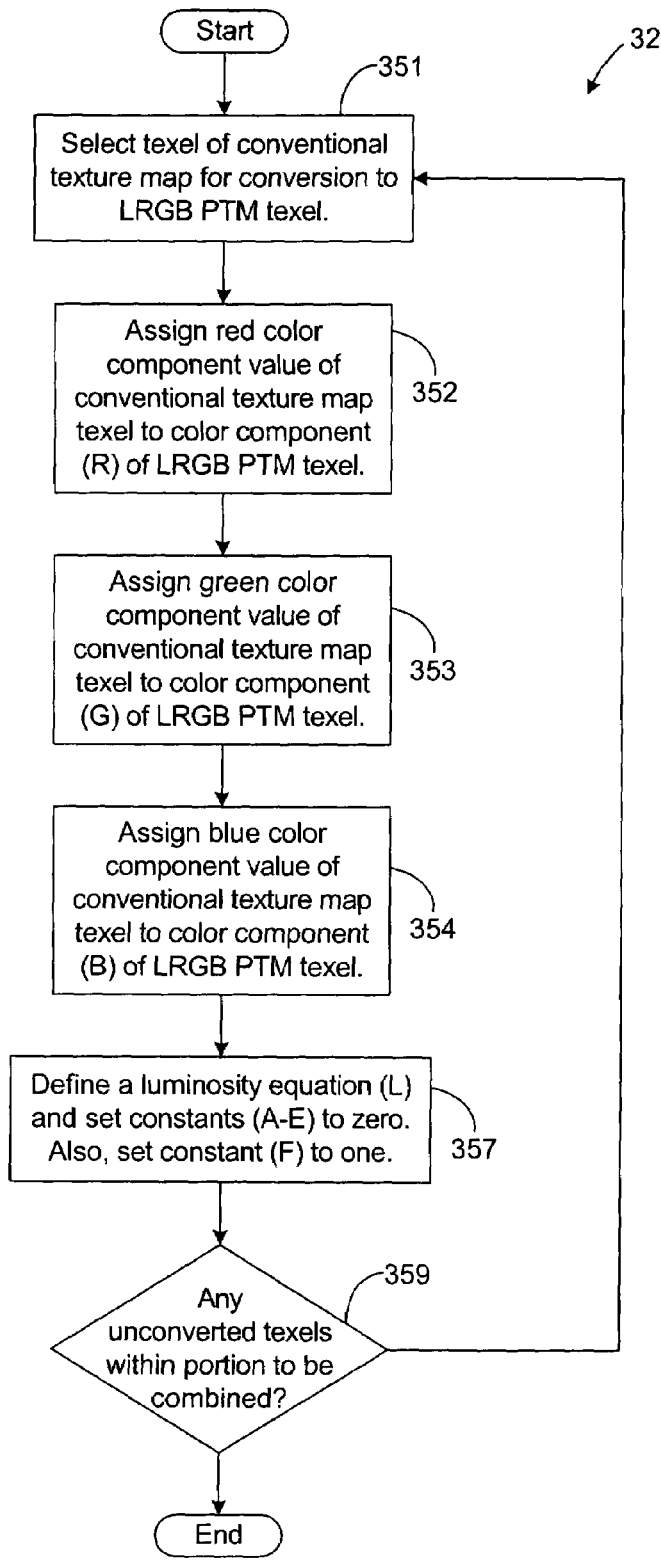
FIG. 18 is a flow chart illustrating an exemplary process for converting a conventional texture map into an LRGB PTM in accordance with an exemplary embodiment of the present invention.

To convert a portion of the conventional texture map 321 into the LRGB PTM 325, the manager 32 preferably converts the texel data of each texel within the conventional texture map portion into texel data of a form consistent with the LRGB PTM 323. As set forth above, a texel of a conventional texture map 321 may comprise a plurality of constant color component values (one value each for the red, green, and blue color components). Furthermore, a texel of an LRGB PTM 323 may comprise color component values (R, G, and B) and a luminosity equation (L). Moreover, to convert a texel of the conventional texture map portion into a texel of the LRGB PTM 325, the manager 32 preferably assigns the color component values (R, G, and B), as defined by the conventional texture map texel, to the LRGB PTM texel, as depicted by blocks 351–354 of FIG. 18.

More specifically for each texel, the red color component value of the texel of the conventional texture map 321 is utilized as the color component value (R) for the LRGB PTM texel (i.e., the corresponding texel in the LRGB PTM 325). Furthermore, the green color component value of the texel of the conventional texture map 321 is utilized as the color component value (G) for the LRGB PTM texel, and the blue color component value of the texel of the conventional texture map is utilized as the color component value (B) for the LRGB PTM texel. In addition, the manager 32 preferably generates a luminosity equation (L) for the texel.

In this regard, as described above, a luminosity equation (L) may be generally expressed as:

$$L = F(u,v) = Au^2 + Bv^2 + Cuv + Du + Ev + F.$$

The manager 32 preferably assigns each of the constants (A–E) of the texel's luminosity equation a value of zero, and the manager 32 preferably assigns the constant (F) of this luminosity equation a value of one, as depicted by block 357. Such a luminosity equation, when the texel is applied to a surface of a graphical object during texture mapping according to the techniques previously described above, will not change, based on light direction, the luminosity value determined for the texel. In other words, such an equation indicates that the luminosity behavior of the texel is not altered by changes in light direction.

As indicated by block 359, the aforedescribed process of converting a conventional texture map texel into an LRGB PTM texel continues until each texel that is to be combined with the LRGB PTM 323 is converted into a form consistent with LRGB PTM texels. Thus, according to the foregoing techniques, the manager 32 defines, for each texel within the portion of the conventional texture map 321 to be combined with the LRGB PTM 323, a set of color component values (R, G, and B) and a luminosity equation (L). Each such set of color component values and the corresponding luminosity equation preferably define a texel within the LRGB PTM 325. As a result, the form of each texel within the combined portion of the LRG BTM 325 is consistent with the LRGB PTM 323.

Now assume that a portion of LRGB PTM 323 is to be combined with an RGB PTM 326. In such an example, it may be desirable to convert the LRGB PTM portion into a form consistent with the RGB PTM 326. Thus, the manager 32 may be configured to convert the portion of the LRGB PTM 323 into an RGB PTM 327 and then combine the RGB PTMs 326 and 327.

To convert a portion of the LRGB PTM 323 into the RGB PTM 327, the manager 32 preferably converts the texel data of each texel within the LRGB PTM portion into texel data of a form consistent with the RGB PTM 326. As set forth above, a texel of the LRGB PTM 323 preferably comprises color component values (R, G, and B) and a luminosity equation (L). Furthermore, a texel of the RGB PTM 326 preferably comprises color component luminosity equations ($L_{red}$, $L_{green}$, and $L_{blue}$). Moreover, to convert a texel of the LRGB PTM portion into a texel of the RGB PTM 327, the manager 32 preferably defines color component luminosity equations ($L_{red}$, $L_{green}$, and $L_{blue}$) for the RGB PTM texel based on the color component values (R, G, and B) of the LRGB PTM texel and based on the coefficients (A–F) of the luminosity equation (L) of the LRGB PTM texel. More specifically, to determine each of the coefficients of the color component luminosity equations ($L_{red}$, $L_{green}$, and $L_{blue}$) for a texel of the RGB PTM 327, the manager 32 preferably multiplies the corresponding coefficient of the LRGB PTM's luminosity equation (L) by the corresponding LRGB PTM color component value (R, G, or B).

Figure 19:
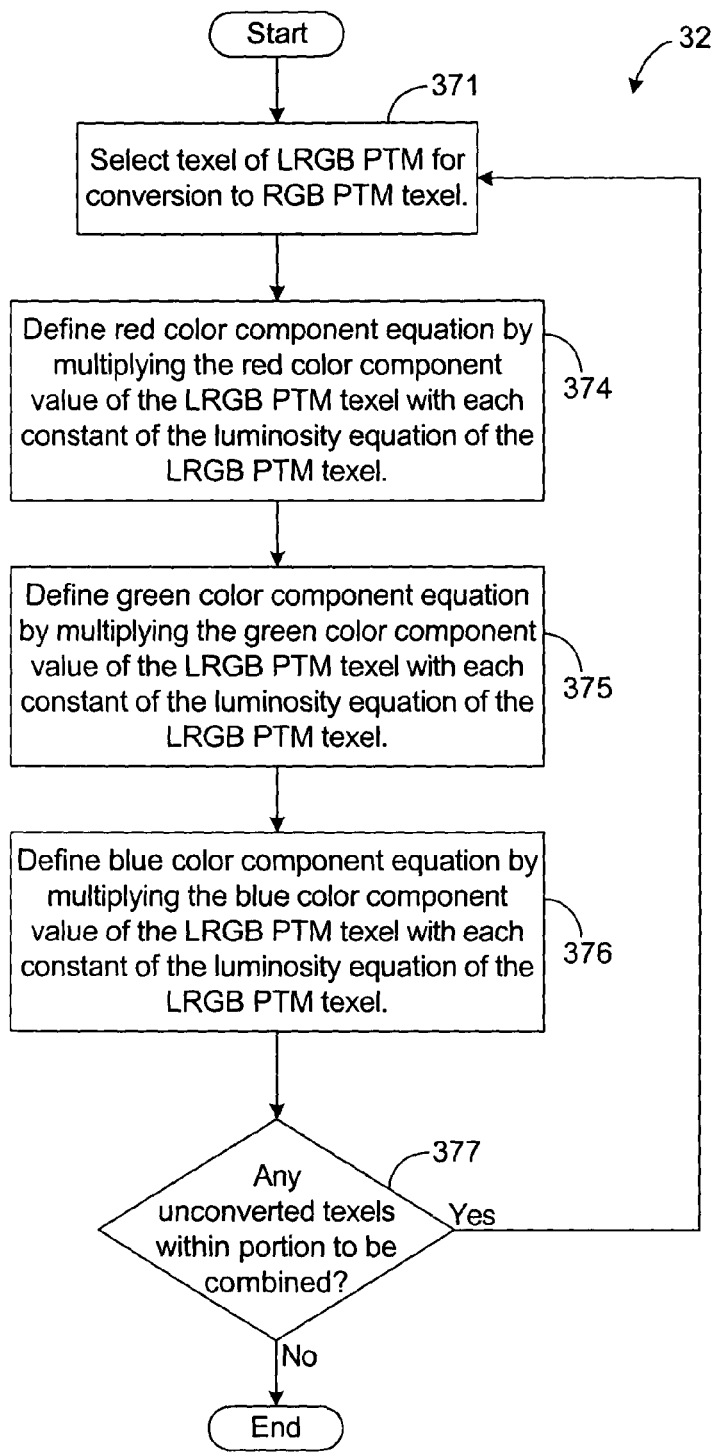
FIG. 19 is a flow chart illustrating an exemplary process for converting an LRGB PTM into an RGB PTM in accordance with an exemplary embodiment of the present invention.

For example, the manager 32 may select a texel of the LRGB PTM 323 in block 371 of FIG. 19 and then define color component equations ($L_{red}$, $L_{green}$, and $L_{blue}$) in blocks 374–376, respectively, for the corresponding texel in the RGB PTM 327 (e.g., the texel having the same coordinates as the selected LRGB PTM texel). In performing block 374, the manager 32 may determine the coefficients ($A_{red}$, $B_{red}$, $C_{red}$, $D_{red}$, $E_{red}$, and $F_{red}$) of the red color component luminosity equation ($L_{red}$) for the RGB PTM texel based respectively on the coefficients (A, B, C, D, E, and F) of the luminosity equation (L) for the LRGB PTM texel and based on the corresponding color component (R) from the LRGB PTM texel according to the following equations:

$A_{red}=A*R,$ $B_{red}=B*R,$ $C_{red}=C*R,$ $D_{red}=D*R,$ $E_{red}=E*R,$ and $F_{red}=F*R,$ where "*" refers to a multiplication operation. Furthermore, the manager 32 may determine the coefficients ($A_{green}$, $B_{green}$, $C_{green}$, $D_{green}$, $E_{green}$, and $F_{green}$) of the green color component luminosity equation ($L_{green}$) for the RGB PTM texel based respectively on the coefficients (A, B, C, D, E, and F) of the LRGB PTM's luminosity equation (L) for the LRGB PTM texel and based on the corresponding color component (G) from the LRGB PTM texel according to the following equations:

$A_{green}=A*G,$ $B_{green}=B*G,$ $C_{green}=C*G,$ $D_{green}=D*G,$ $E_{green}=E*G,$ and $F_{green}=F*G.$ In addition, the manager 32 may determine the coefficients ($A_{blue}$, $B_{blue}$, $C_{blue}$, $D_{blue}$, $E_{blue}$, and $F_{blue}$) of the blue color component luminosity equation ($L_{blue}$) for the RGB PTM texel based respectively on the coefficients (A, B, C, D, E, and F) of the luminosity equation (L) and based on the corresponding color component (B) from the LRGB PTM texel according to the following equations:

$A_{blue}=A*B,$ $B_{blue}=B*B,$ $C_{blue}=C*B,$ $D_{blue}=D*B,$ $E_{blue}=E*B,$ and $F_{blue}=F*B.$ Thus, according to the above equations, the manager 32 may define a set of color component luminosity equations ($L_{red}$, $L_{green}$, and $L_{blue}$) for the RGB PTM texel, which may be represented as:

$L_{red}=F(u,v)$
$\quad =A_{red}u^2+B_{red}v^2+C_{red}uv+D_{red}u+E_{red}v+F_{red},$ $L_{green}=F(u,v)$
$\quad =A_{green}u^2+B_{green}v^2+C_{gre}uv+D_{gre}u+E_{green}v+F_{green},$
and $L_{blue}=F(u,v)$
$\quad =A_{blue}u^2+B_{blue}v^2+C_{gre}uv+D_{gre}u+E_{blue}v+F_{blue}.$ As shown in block 377, the aforedescribed process of converting an LRGB PTM texel into an RGB PTM texel continues until each texel that is to be combined with the RGB PTM 326 is converted into a form consistent with RGB PTM texels.

Note that the color component equations ($L_{red}$, $L_{green}$, and $L_{blue}$) calculated from a texel of the LRGB PTM 323 according to the aforedescribed techniques indicate that each color component responds to changes in light direction in the same way (i.e., consistent with the behavior defined by the luminosity equation (L) associated with the corresponding texel of the LRGB PTM 323). Thus, color component luminosity equations ($L_{red}$, $L_{green}$, and $L_{blue}$) of an RBG PTM texel converted from an LRGB PTM texel, unlike an RGB PTM texel generated according to the process depicted in FIGS. 13 and 14, define the same luminosity behavior for each different color component.

Moreover, by implementing the process depicted by FIG. 19, texel data of the LRGB PTM 323 can be converted into a form consistent with the RGB PTM 326. Note that, to combine a portion of the conventional texture map 321 with the RGB PTM 326, the manager 32 may be configured to convert the conventional texture map portion into the LRGB PTM 325, according to the process depicted by FIG. 18. Then, the manager 32 may convert the LRGB PTM 325 into an RGB PTM 329, according to the process depicted by FIG. 19. The RGB PTM 329 may then be combined with the RGB PTM 326.

Now, therefore, the following is claimed:

1. A texture mapping system, comprising:
   memory for storing a first texture map and a parametric texture map; and
   a texture map manager configured to combine at least a portion of the first texture map and at least a portion of the parametric texture map, the texture map manager configured to determine a texture map type for the first texture map and a texture map type for the parametric texture map and to perform a prioritization of the texture map portions based on the determined texture map types, the texture map manager further configured to select, for conversion, one of the texture map portions based on the prioritization and to convert the selected texture map portion into a form corresponding to a form of the non-selected texture map portion.

2. The system of claim 1, wherein the first texture map is a parametric texture map.

3. The system of claim 1, where the texture map manager is configured to combine the texture map portions and to perform the prioritization in response to a command to combine the texture map portions.

4. The system of claim 1, wherein the parametric texture map portion defines a plurality of texels, each of the texels defining a luminosity value that is a function of light direction.

5. The system of claim 1, wherein the texture map manager, in converting the selected texture map portion, is configured to assign a predetermined value to at least one texel of the selected texture map portion.

6. The system of claim 1, wherein the texture map manager, in converting the selected texture map portion, is configured to define a new luminosity value for a texel of the selected texture map portion.

7. The system of claim 6, wherein the new luminosity value is a function of light direction.

8. A texture mapping system, comprising:
  memory for storing a first texture map and a parametric texture map; and
  a texture map manager configured to convert at least a portion of a first texture map into a form corresponding to a form of at least a portion of a parametric texture map and to combine the first texture map portion and the parametric texture map portion, wherein the texture map manager is configures to determine a texture map type of the first texture map and a texture map type of the parametric texture map and to perform a prioritization of the texture map portions based on the determined texture map types.

9. The system of claim 8, wherein the texture map manager is further configured to select the first texture map for conversion based on prioritization.

10. A computer-readable medium having a program, the program comprising:
  logic for determining a texture map type of a first texture map and a texture map type of a parametric texture map;
  logic for combining at least a portion of the first texture map and at least a portion of the parametric texture map;
  logic for prioritizing the texture map portions based on the determined texture map types;
  logic for selecting one of the texture map portions based on the prioritizing logic; and
  logic for converting the selected texture map portion into a form compatible with a form of the non-selected texture map portion.

11. A texture mapping system, comprising:
  means for storing a first texture map and a parametric texture map; and
  means for combining, in response to a command, the first texture map and a parametric texture map thereby forming a combined texture map, the combining means configured to convert the first texture map portion into a form compatible with a form of the parametric texture map portion, wherein the combining means is configured to determine a texture map type of the first texture map and a texture map of the parametric texture map and to perform a prioritization of the texture maps based on the determined texture map types.

12. The system of claim 11, wherein the combining means is configured to select the first texture map for conversion based on prioritization.

13. A texture mapping method, comprising:
  determining a texture map type of a first texture map and a texture map type of a parametric texture map;
  combining at least a portion of the first texture map and at least a portion of the parametric texture map;
  prioritizing the texture map portions based on the determined texture map types;
  selecting one of the texture map portions based on the prioritizing; and
  converting, based on the selecting, the selected texture map portion into a form compatible with a form of the non-selected texture map portion for use in displaying a graphical image.

14. The method of claim 13, wherein the first texture map is a parametric texture map.

15. The method of claim 13, wherein the combining and the prioritizing are performed in response to a command to combine the texture map portions.

16. The method of claim 13, wherein the converting further comprises assigning a predetermined value to at least one texel of the selected texture map portion.

17. The method of claim 13, wherein the converting further comprises defining a new luminosity value for a texel of the selected texture map portion.

18. The method of claim 17, wherein the new luminosity value is a function of light direction.

19. A texture mapping method, comprising:
  converting at least a portion of a first texture map into a form compatible with a form of at least a portion of a parametric texture map;
  determining a texture map type of the first texture map and a texture map type of the parametric texture map;
  prioritizing the texture maps based on the determining; and
  combining the first texture map portion and the parametric texture map thereby forming a combined texture map to be used for displaying a graphical image.

* * * * *